US008676940B2

(12) United States Patent
Buonomo et al.

(10) Patent No.: US 8,676,940 B2
(45) Date of Patent: Mar. 18, 2014

(54) COMMUNICATIONS PORTAL

(76) Inventors: Michael Anthony Buonomo, Acton, MA (US); David Joseph Micalizzi, Lincoln, NH (US)

( * ) Notice: Subject to any disclaimer, the term of this patent is extended or adjusted under 35 U.S.C. 154(b) by 534 days.

(21) Appl. No.: 12/954,063

(22) Filed: Nov. 24, 2010

(65) Prior Publication Data
US 2011/0295944 A1 Dec. 1, 2011

Related U.S. Application Data

(60) Provisional application No. 61/264,575, filed on Nov. 25, 2009.

(51) Int. Cl.
*G06F 15/16* (2006.01)

(52) U.S. Cl.
USPC ............................ 709/220; 709/219; 709/203

(58) Field of Classification Search
USPC .......... 709/203, 217–219; 715/744–745, 748; 717/168–178
See application file for complete search history.

(56) References Cited

U.S. PATENT DOCUMENTS

| | | | |
|---|---|---|---|
| 5,297,205 A | 3/1994 | Audebert et al. | |
| 7,020,845 B1 | 3/2006 | Gottfurcht | |
| 7,240,022 B1 | 7/2007 | Bistriceanu et al. | |
| 7,359,723 B2 | 4/2008 | Jones | |
| 7,359,866 B2 | 4/2008 | Farat | |
| 7,441,196 B2 | 10/2008 | Gottfurcht | |
| 7,490,045 B1 | 2/2009 | Flores et al. | |
| 7,627,679 B1 * | 12/2009 | Bowen et al. | 709/227 |
| 2002/0111848 A1 * | 8/2002 | White | 705/10 |
| 2003/0120502 A1 * | 6/2003 | Robb et al. | 705/1 |
| 2006/0218630 A1 * | 9/2006 | Pearson et al. | 726/8 |
| 2008/0221925 A1 | 9/2008 | Jones | |
| 2008/0319847 A1 | 12/2008 | Shepard | |
| 2009/0083125 A1 | 3/2009 | Yasnoff et al. | |
| 2009/0098939 A1 | 4/2009 | Hamilton, II et al. | |
| 2010/0011415 A1 * | 1/2010 | Cortes et al. | 726/4 |
| 2011/0022641 A1 * | 1/2011 | Werth et al. | 707/803 |
| 2011/0126240 A1 * | 5/2011 | Putterman et al. | 725/60 |
| 2012/0017253 A1 * | 1/2012 | Hicks et al. | 725/114 |
| 2012/0084183 A1 * | 4/2012 | Shanker et al. | 705/30 |
| 2012/0303811 A1 * | 11/2012 | Markwart et al. | 709/225 |
| 2013/0132854 A1 * | 5/2013 | Raleigh et al. | 715/738 |

OTHER PUBLICATIONS

Twitter. Printed Jun. 6, 2009. "Twitter API Method: search." http://apiwiki.twitter.com/Twitter-Search-API-Method%3A-search. 3 pages.

* cited by examiner

*Primary Examiner* — Brenda Higa
(74) *Attorney, Agent, or Firm* — Anthony L. Miele

(57) ABSTRACT

Per one embodiment, apparatus may be provided that include a communications portal and a back-end system. The communications portal includes a provider interface accessible by providers and a target user interface accessible by target users. The back-end system may include an deployment management. The provider interface is configured to present graphical user interface tools representing offering options. The graphical user interface tools are presented on a remote provider data access point device display remote from the provisioning portal while the remote provider data access point device is authenticated for a given provider. The offering options include "provider selectable assets" screen inputs configured to receive asset selections from the given provider, and "asset location and identifying data" screen inputs configured to receive data locating and identifying assets selected by the given provider.

20 Claims, 17 Drawing Sheets

COMMUNICATIONS PORTAL

RELATED APPLICATION DATA

This application claims priority to Provisional Patent Application No. 61/264,575 filed Nov. 25, 2009, the content of which is hereby incorporated herein by reference in its entirety.

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

FIELD OF THE DISCLOSURE

The present disclosure relates to tools to improve communication between parties. Certain aspects of the disclosure relate to improving communication and information access among providers and users (e.g., product vendors and consumers). Other aspects of the disclosure relate to better tailoring the types of data that providers and users can each access about the other.

BACKGROUND OF THE DISCLOSURE

Communications technologies continue to evolve. In the past, when people communicated over long distances, they used landline telephones, television sets, and radios. Today, students, workers, even retirees use a variety of newer more personalized data access devices. As people continue to use these newer more personalized data access devices, their behavior is changing. People are tailoring their devices to suit their own preferences. For example, a user may configure his or her mobile phone to have one or more unique ringtones, personalized wallpaper, and a Facebook widget. In addition, people are taking their devices with them wherever they go. A user may do this in the literal sense by carrying his or her laptop or mobile device, or in the virtual sense by accessing an individualized data access web portal, such as iGoogle, Facebook, or LinkedIn, on any borrowed device or kiosk with web access.

As individuals gain more control over their data access devices, they also want more control over both the information they receive and the information they provide to others. Meanwhile, media, product, and service providers want to both reach out to and exchange information with these individuals, without limiting the individuals' ability to configure their data access devices.

SUMMARY OF THE DISCLOSURE

An objective of the present disclosure may be to provide new ways for people to personalize their data access points. Another objective may be to provide a communications portal that improves and better tailors data exchanges between providers and users.

One or more alternate or additional objectives may be served by the present disclosure, e.g., as may be apparent by the following description. Embodiments of the disclosure include any apparatus, machine, system, method, articles (e.g., computer-readable media), or any one or more subparts or subcombinations of such apparatus (singular or plural), system, method, or article, e.g., as supported by the present disclosure. Embodiments herein also contemplate that any one or more processes as described herein may be incorporated into a processing circuit.

In accordance with one embodiment of the present disclosure, apparatus may be provided that include a communications portal and a back-end system. The communications portal includes a provider interface and a user interface. The back-end system may include a deployment manager. The provider interface is configured to present "offering options" graphical user interface tools, on a display of a provider data access point device that is remote from the communications portal. The offering options graphical user interface tools may include "provider selectable assets" screen inputs configured to receive asset selections from the given provider, and "asset location and identifying data" screen inputs configured to receive data locating and identifying the assets selected by the given provider via the provider selectable assets screen inputs.

DETAILED DESCRIPTION OF THE DRAWINGS

Example embodiments will be described with reference to the following drawing figures in which.

Figure 1:
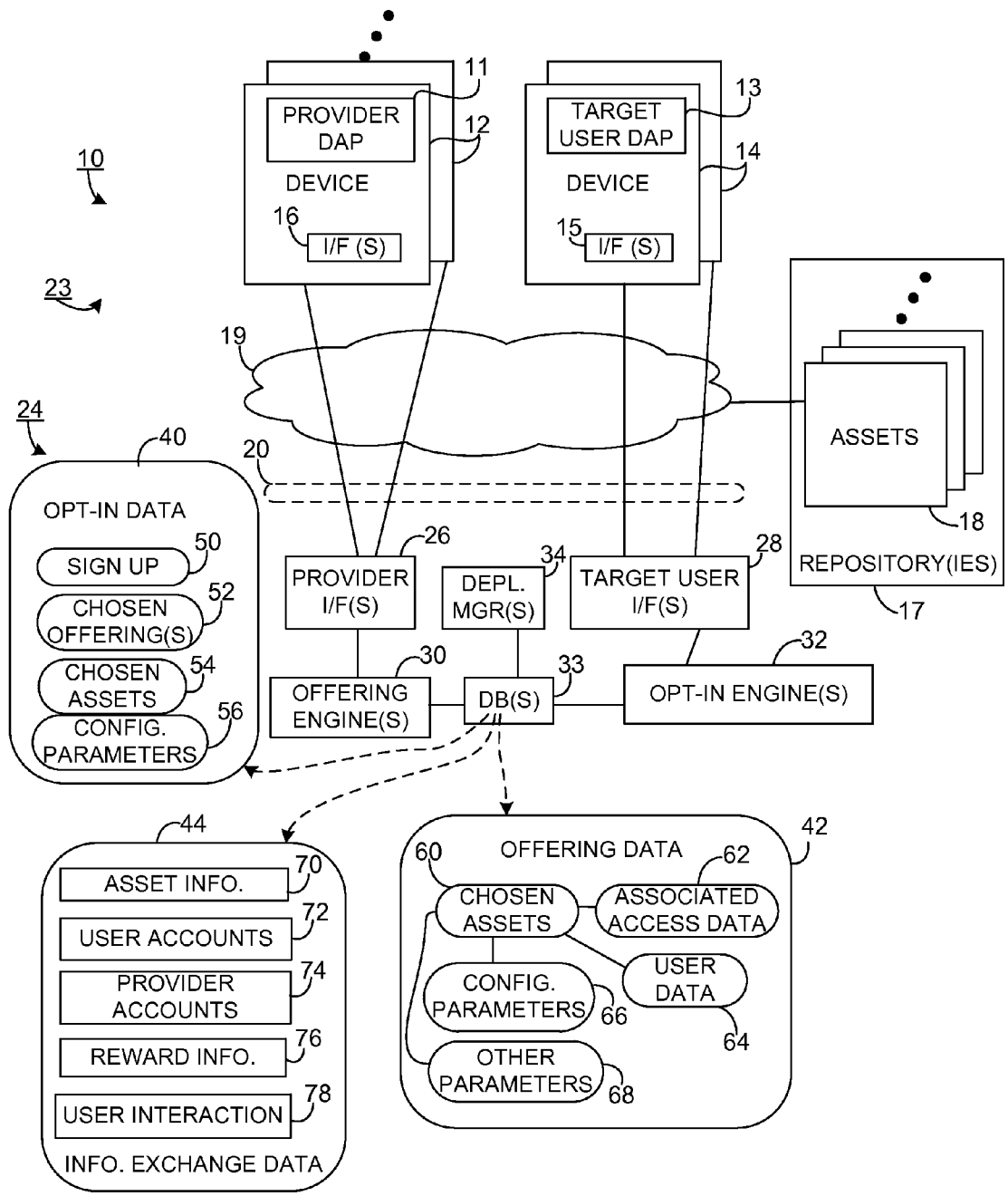
FIG. 1 is a block diagram of a communications system.
Figure 3:
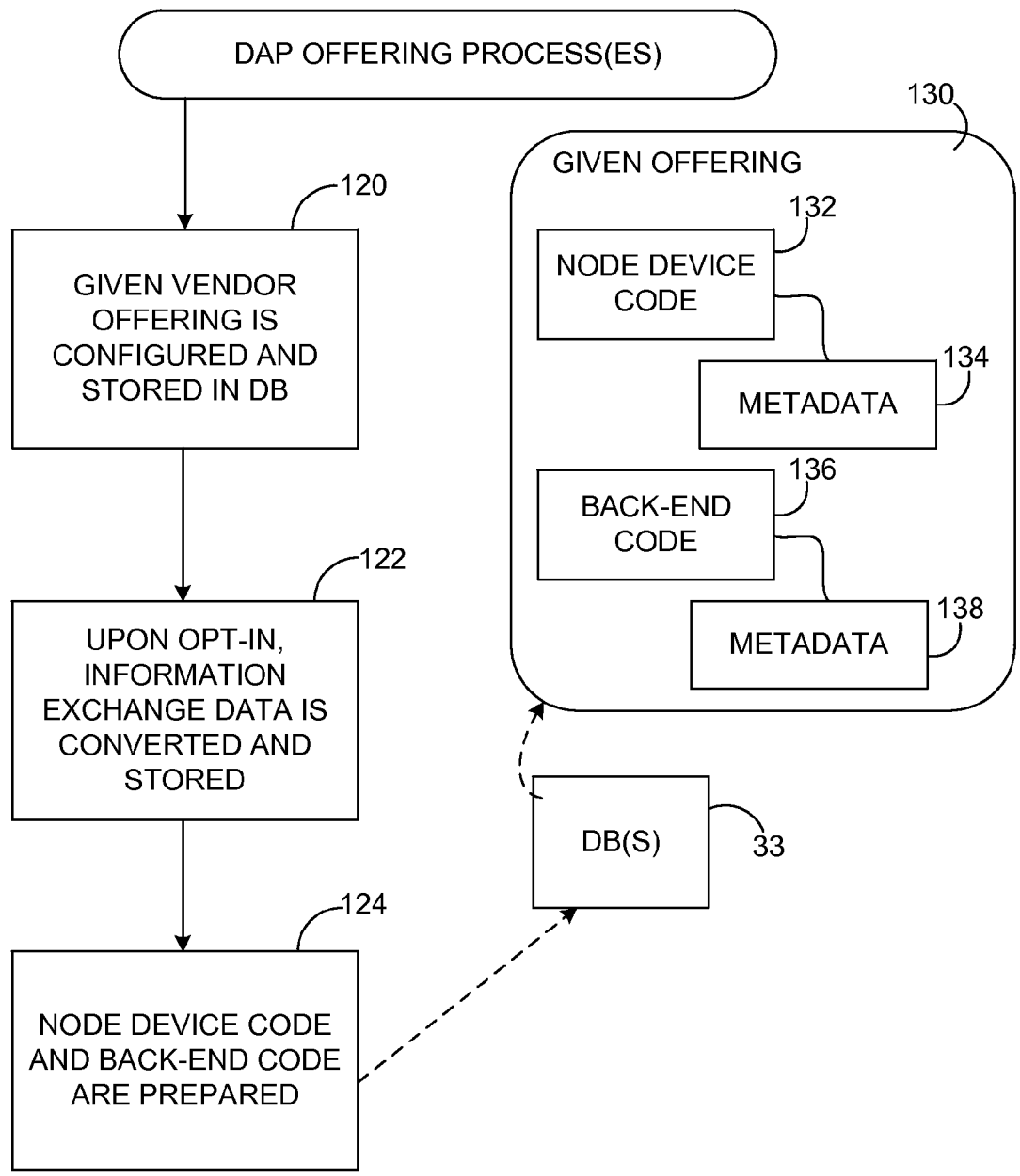
Figure 4:
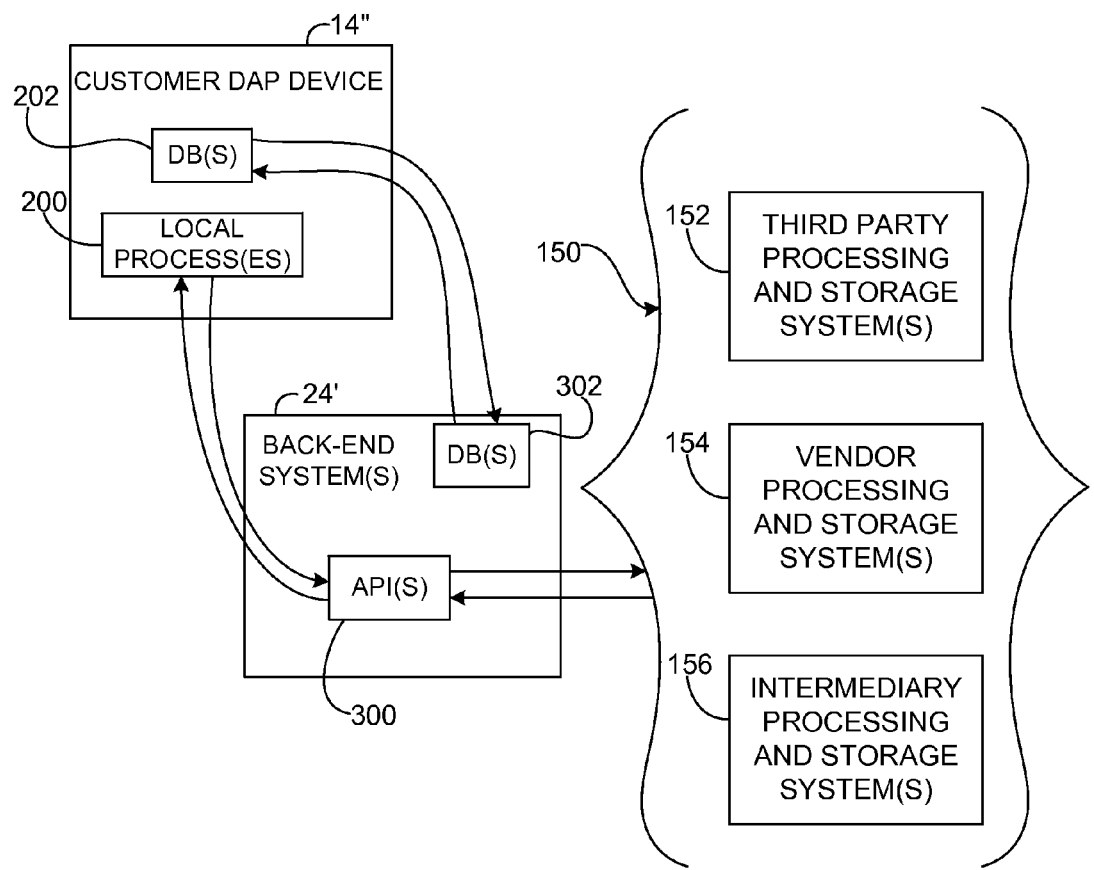
Figure 5A:
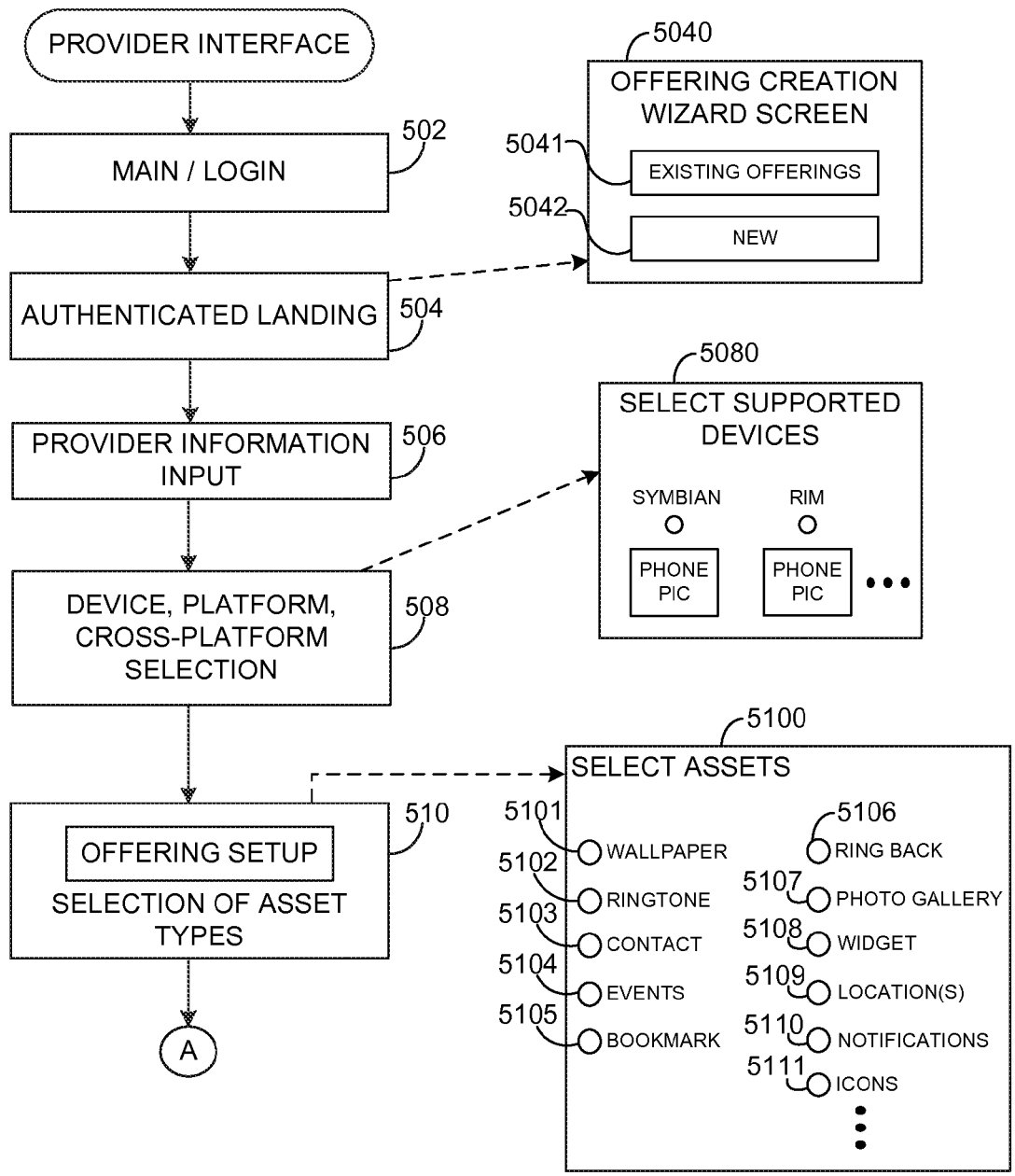
Figure 5B:
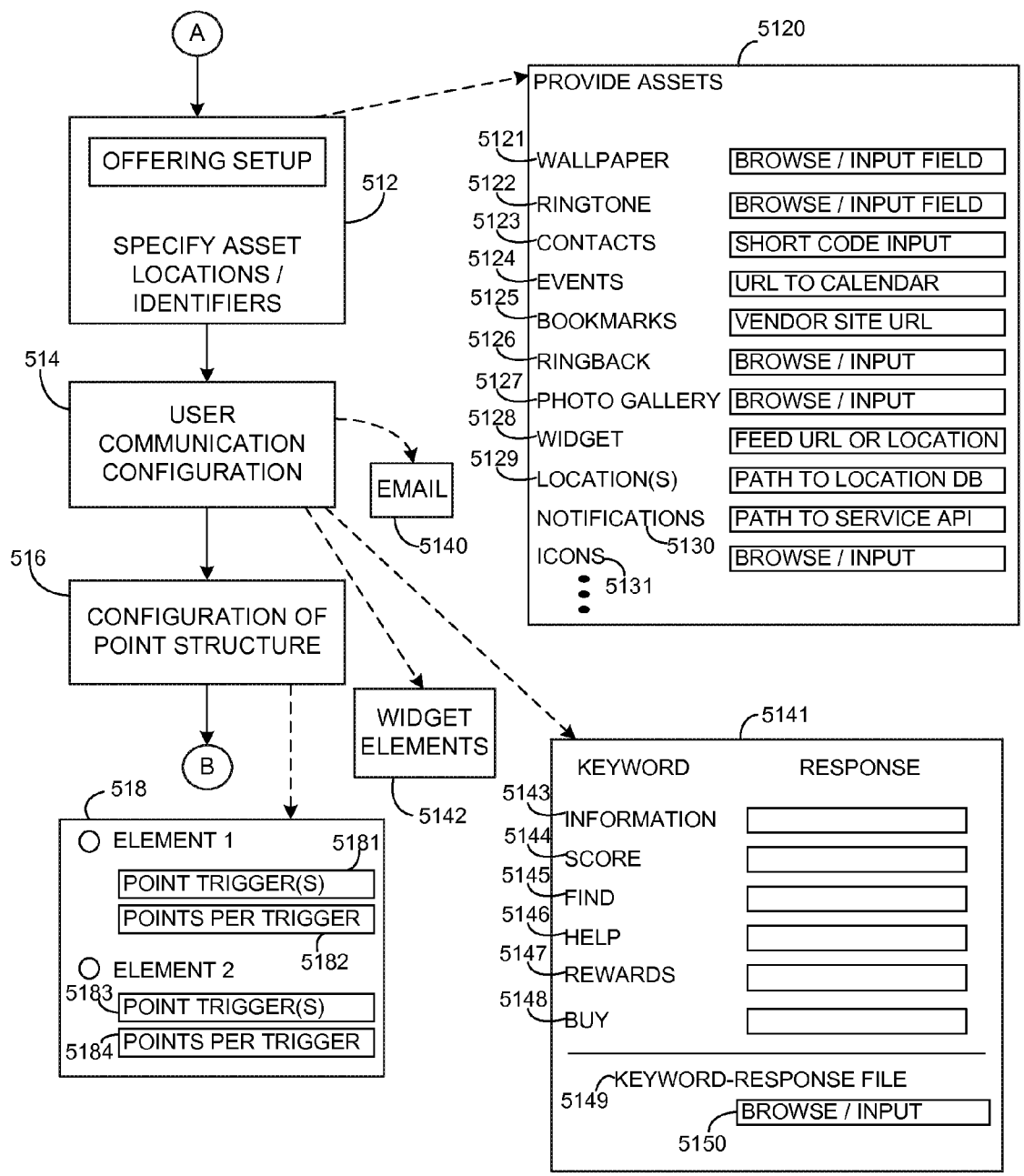
Figure 5C:
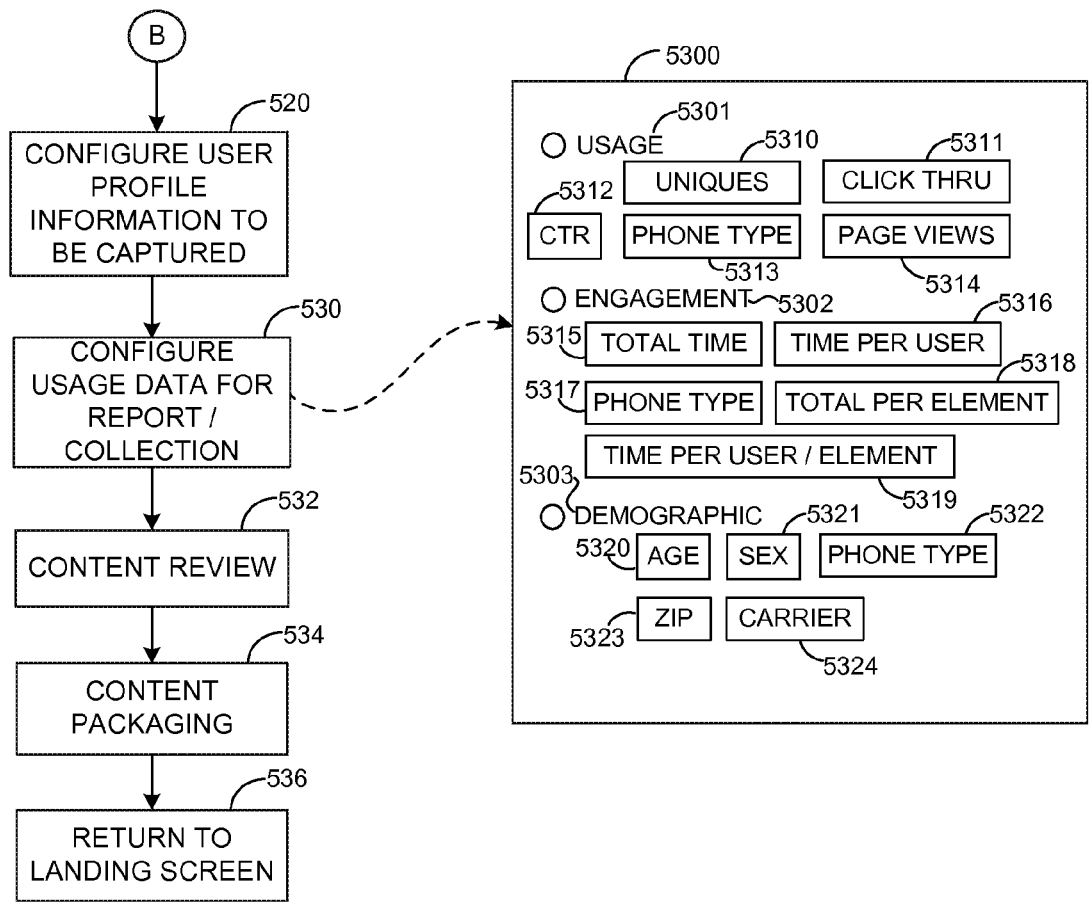
Figure 6A:
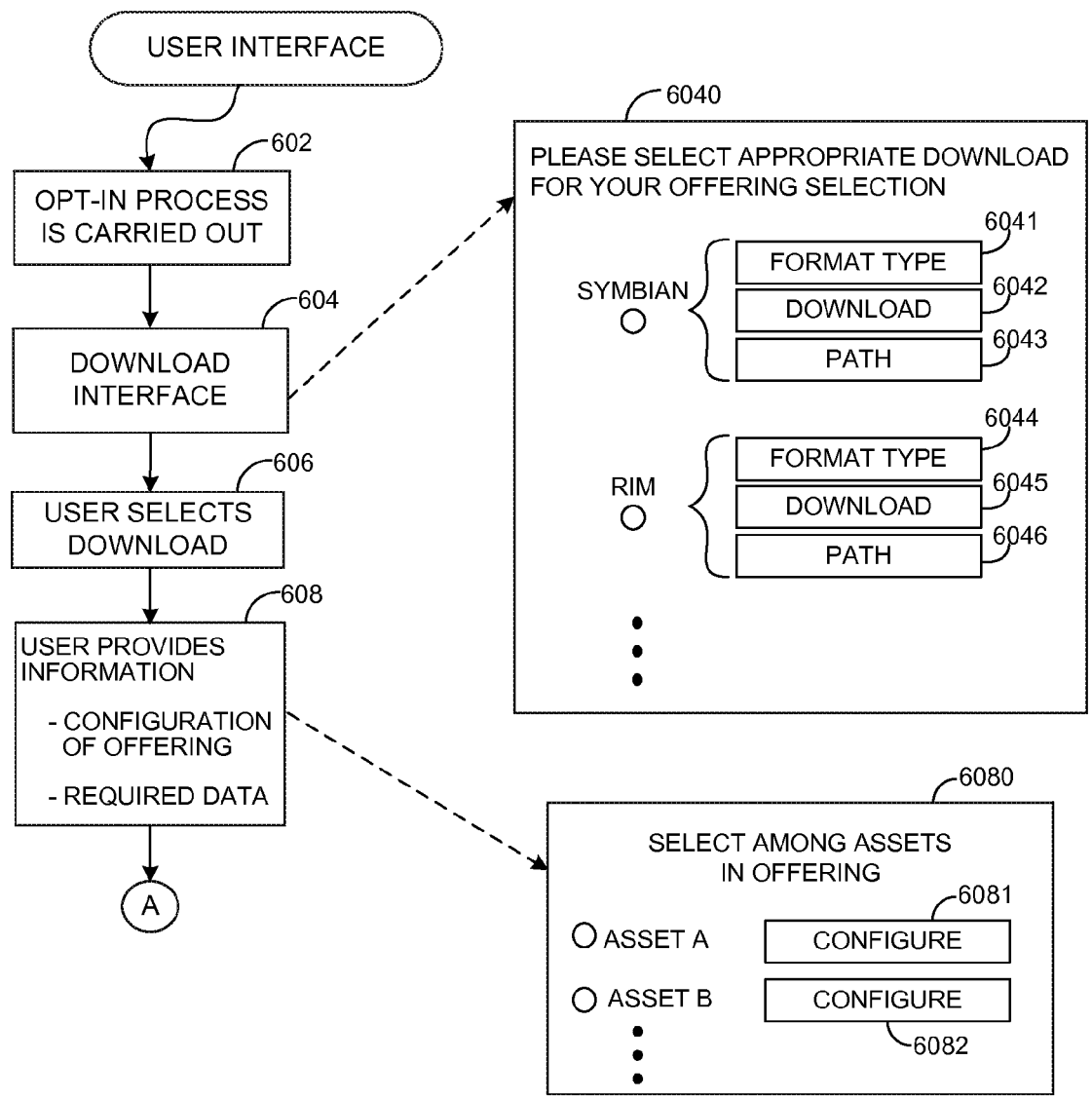
Figure 6B:
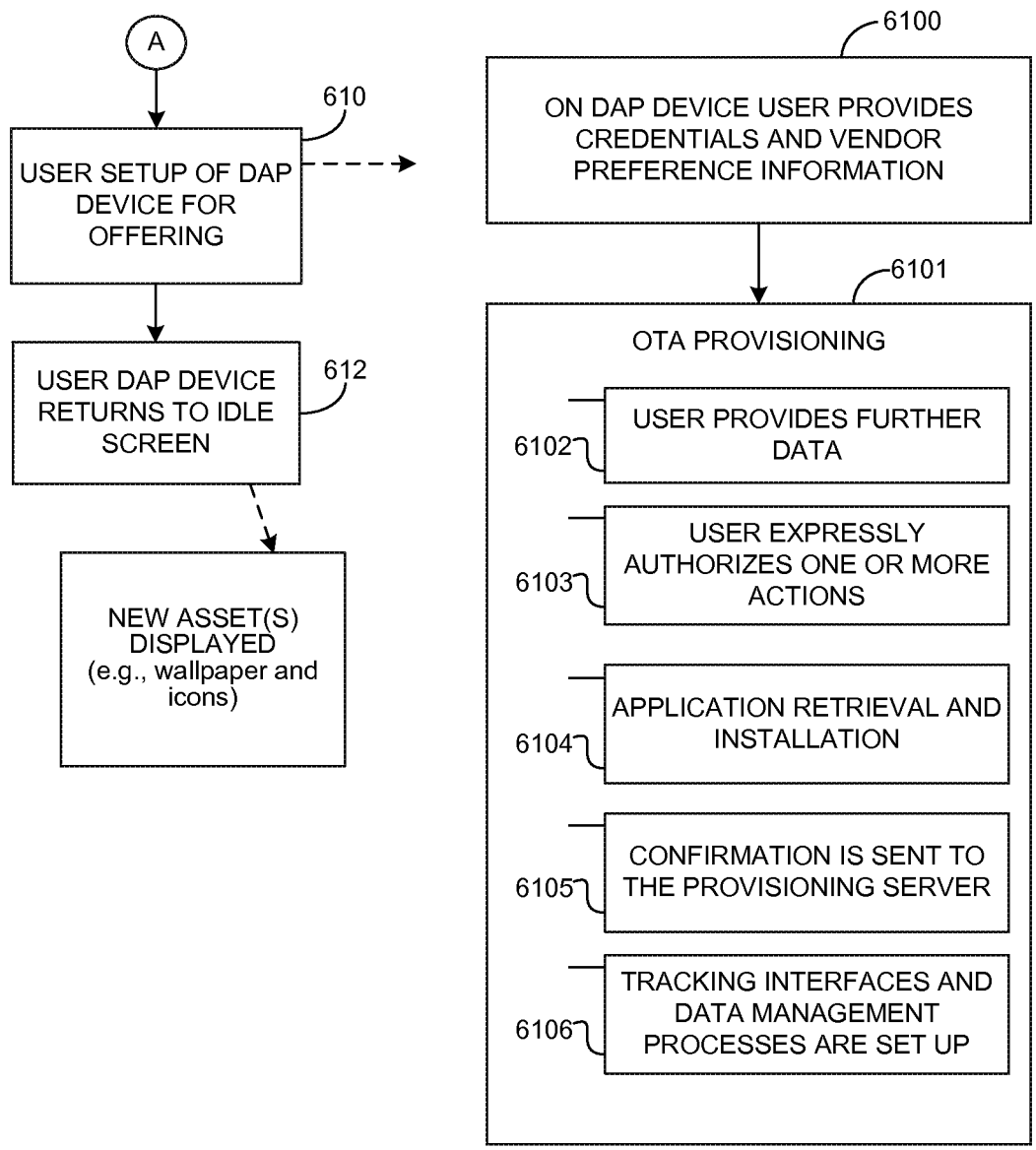
Figure 7:
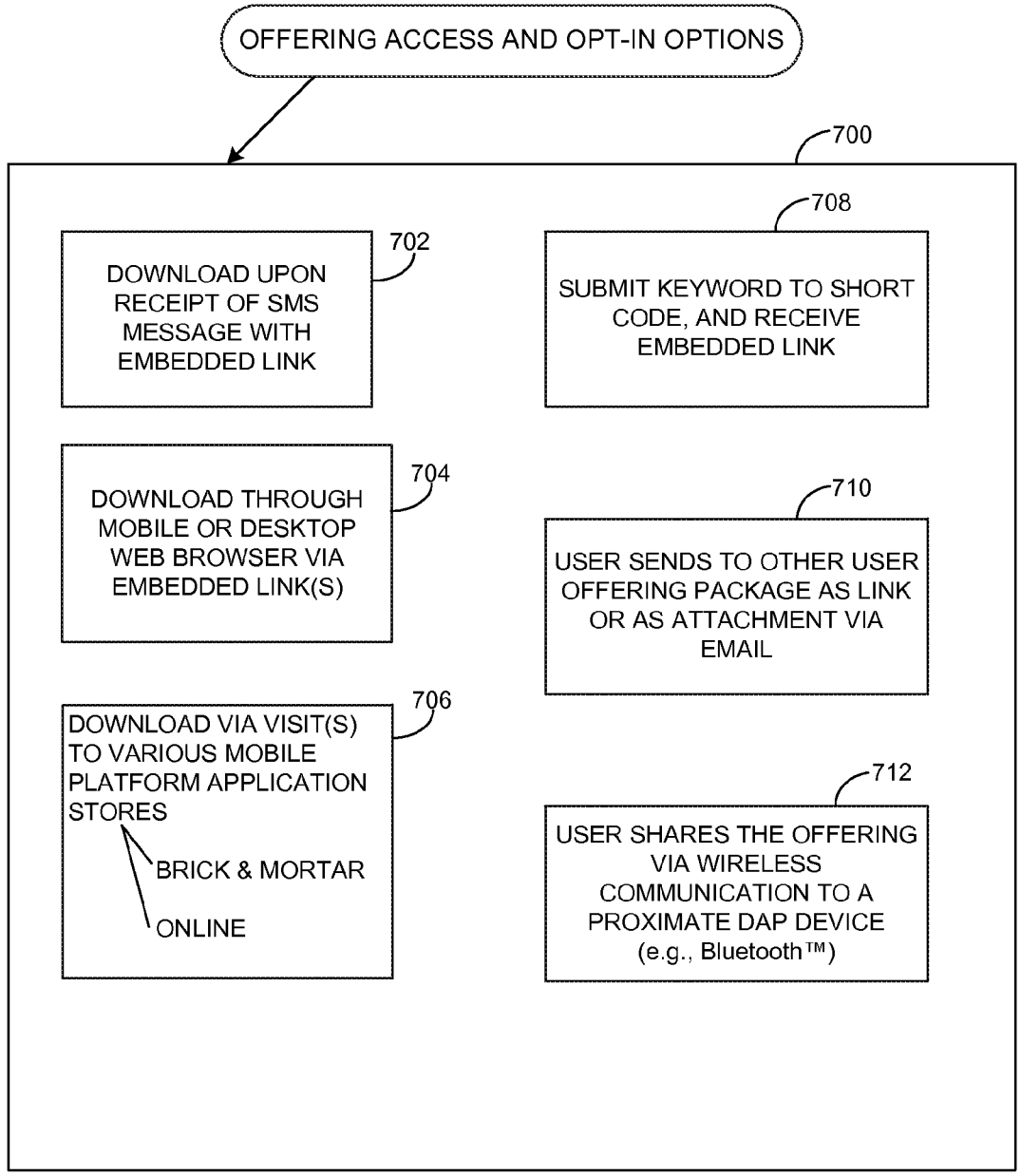
Figure 8:
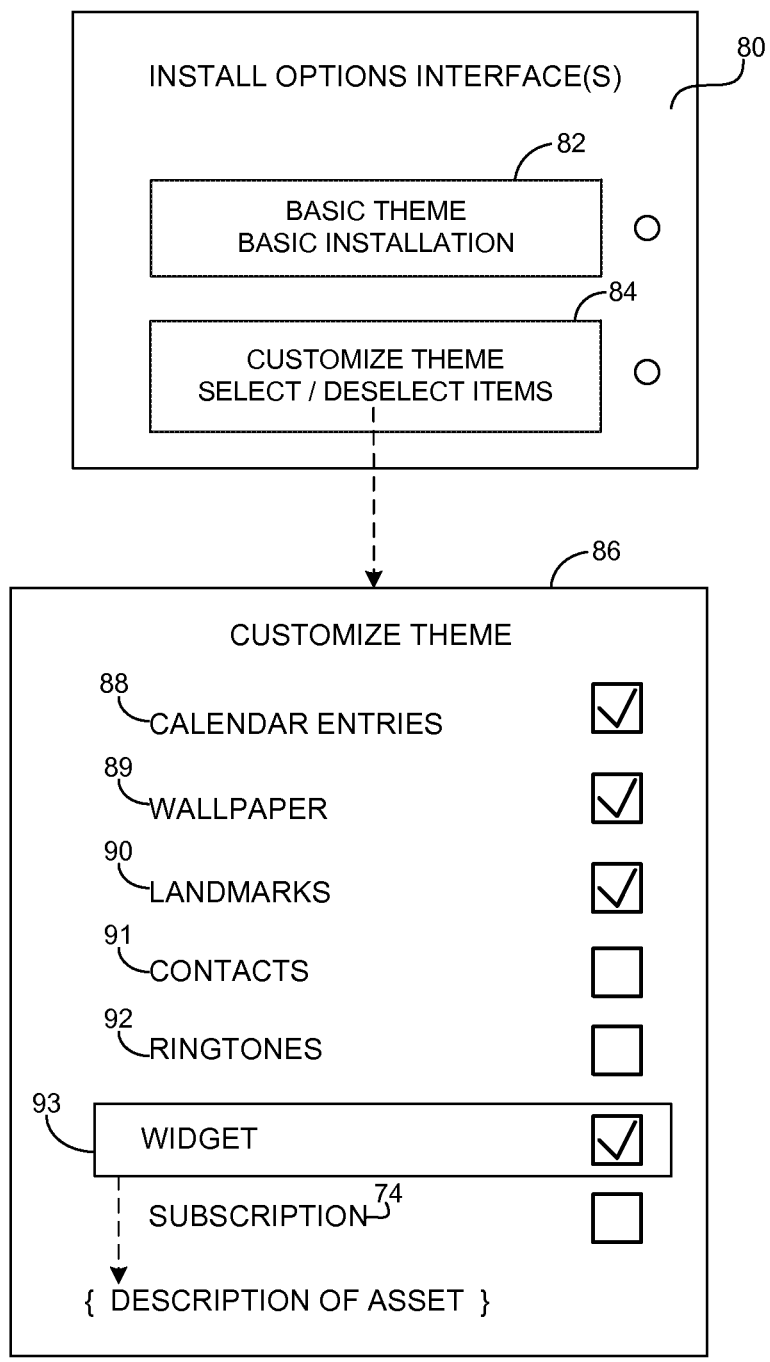

FIG. 3 combines a flowchart illustrating acts of one or more DAP offering processes and a schematic representation of some data structures produced as a result of such processes;

FIG. 4 is a block diagram of an example distribution of some processing circuits, databases, and data from the system shown in FIG. 1;

FIGS. 5A-5C present a flowchart of acts of provider interface processes along with schematic representations of user interface elements;

FIGS. 6A-6B present a flowchart of user interface processes along with schematic representations of user interface elements;

FIG. 7 provides schematic representations of user interface elements representing a target user's access and opt-in options for a given offering;

FIG. 8 provides schematic representations of user interface elements representing one or more install options.

Figure 9:
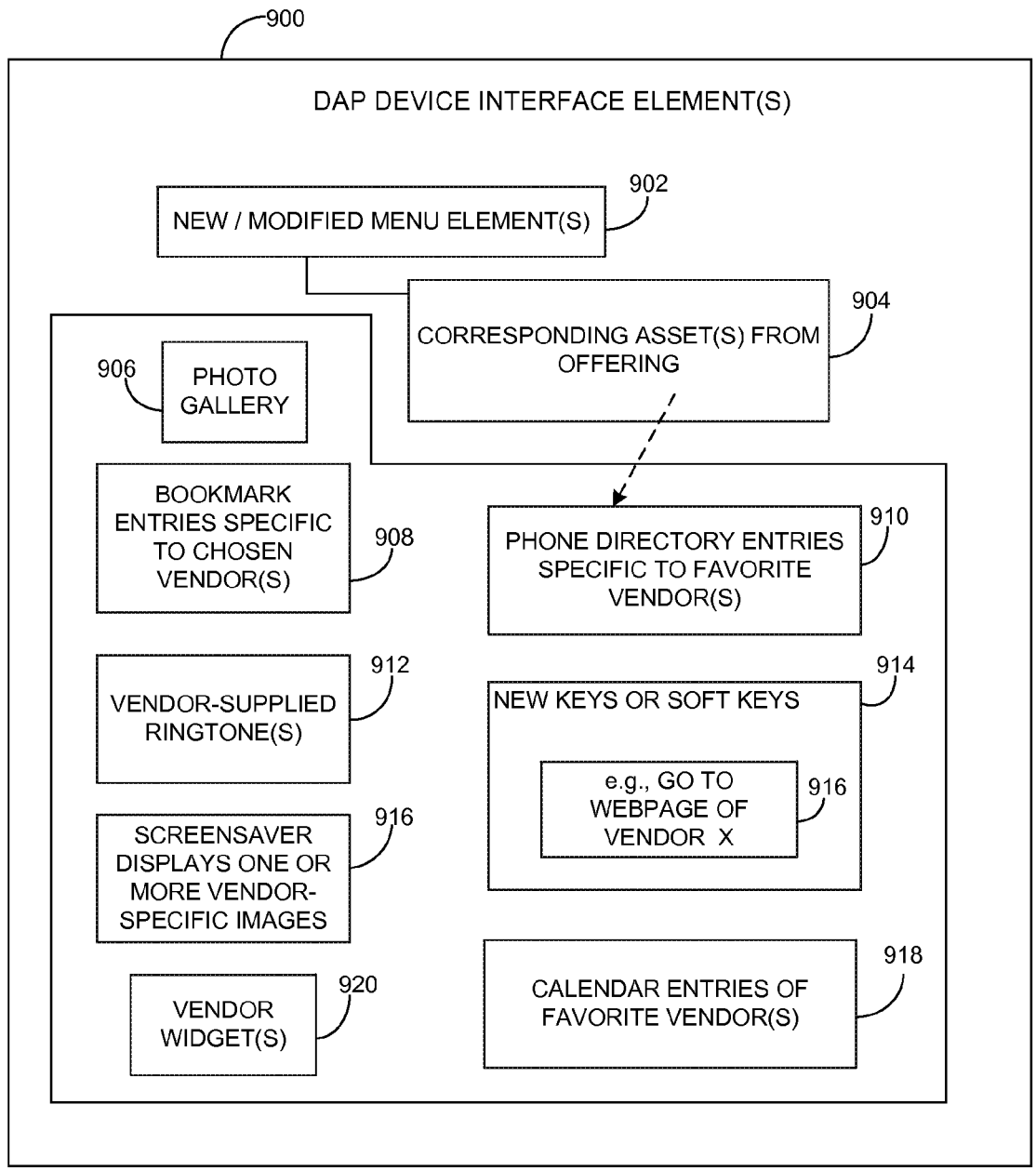
Figure 10:
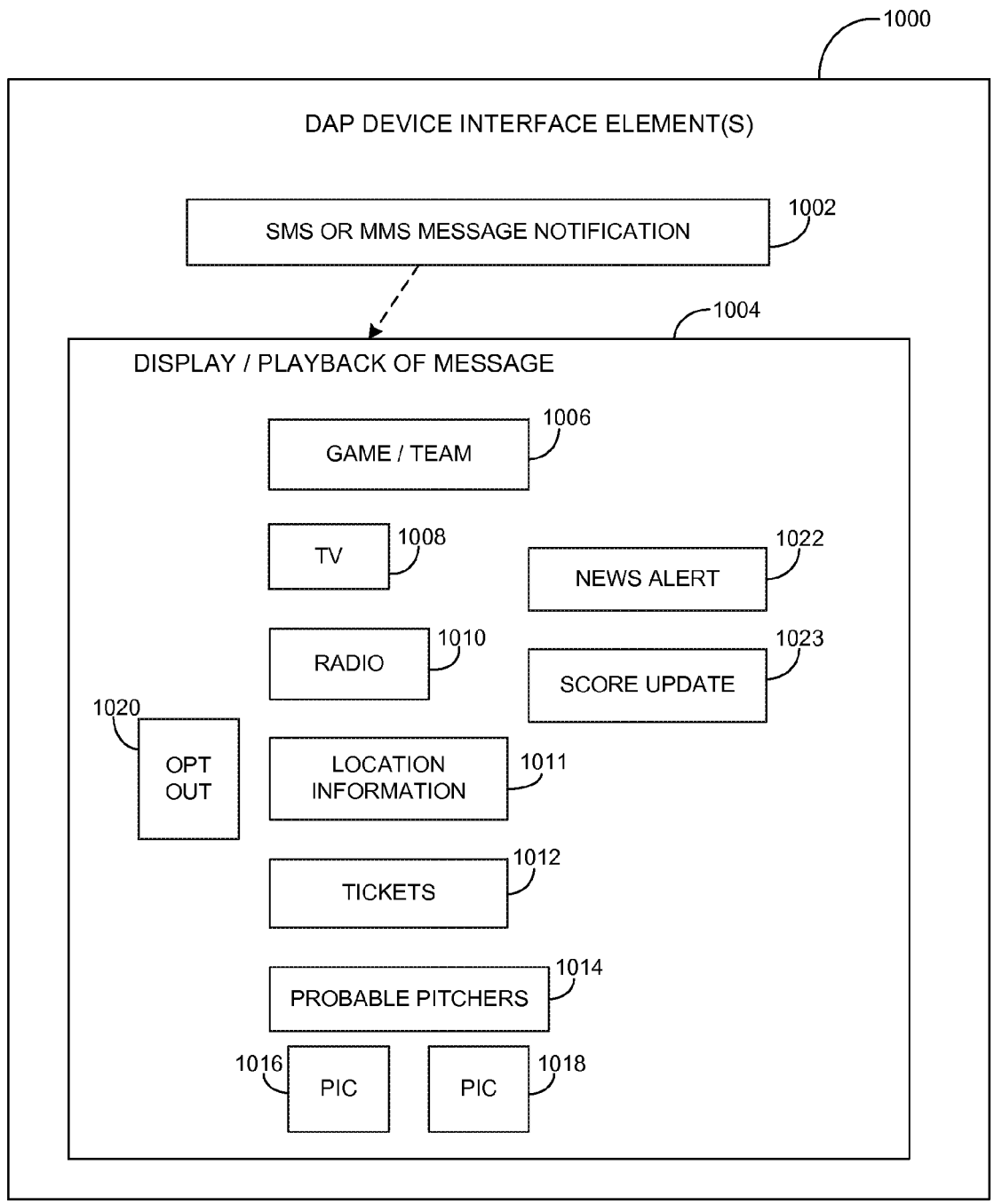
Figure 11:
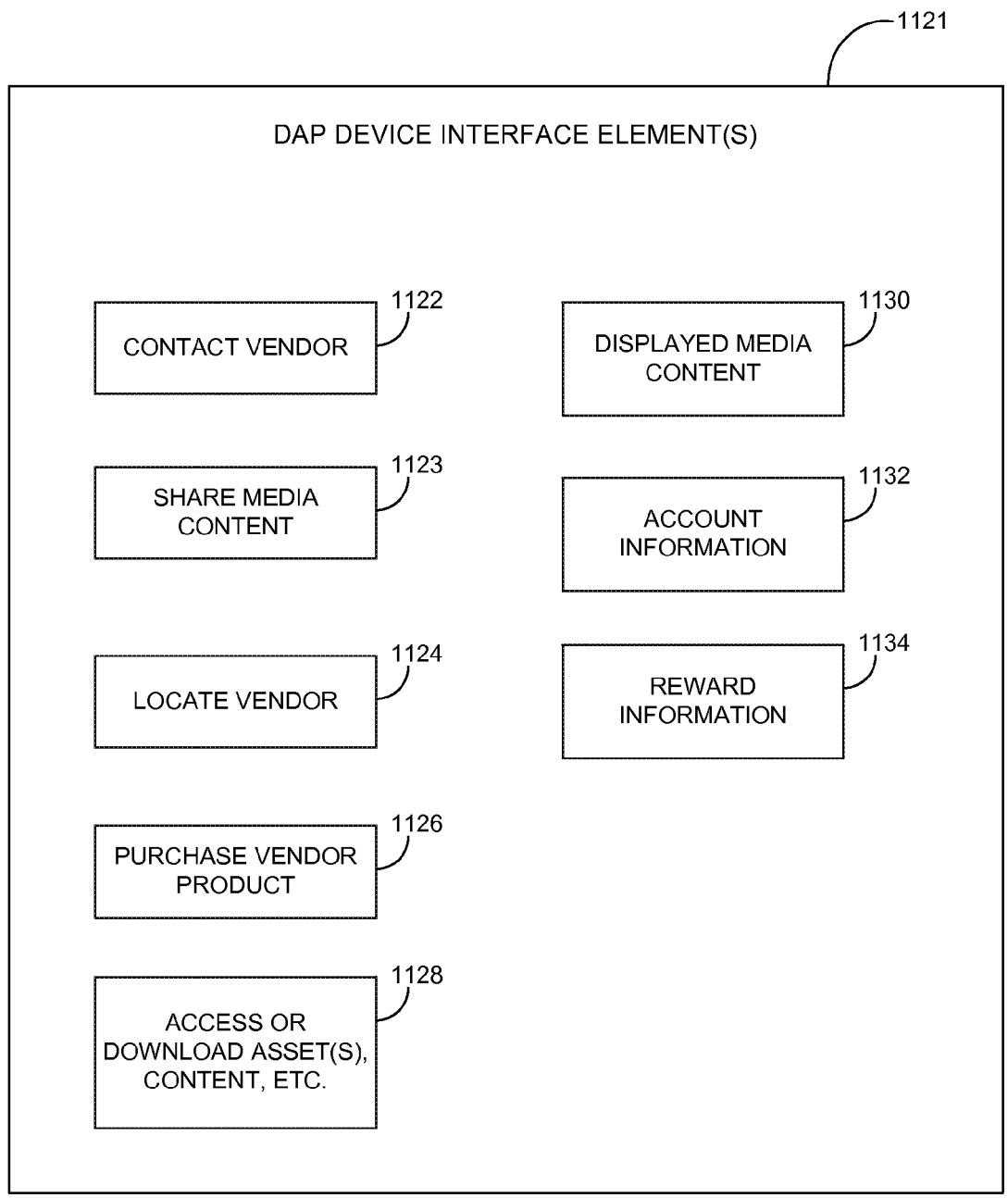
Figure 12:
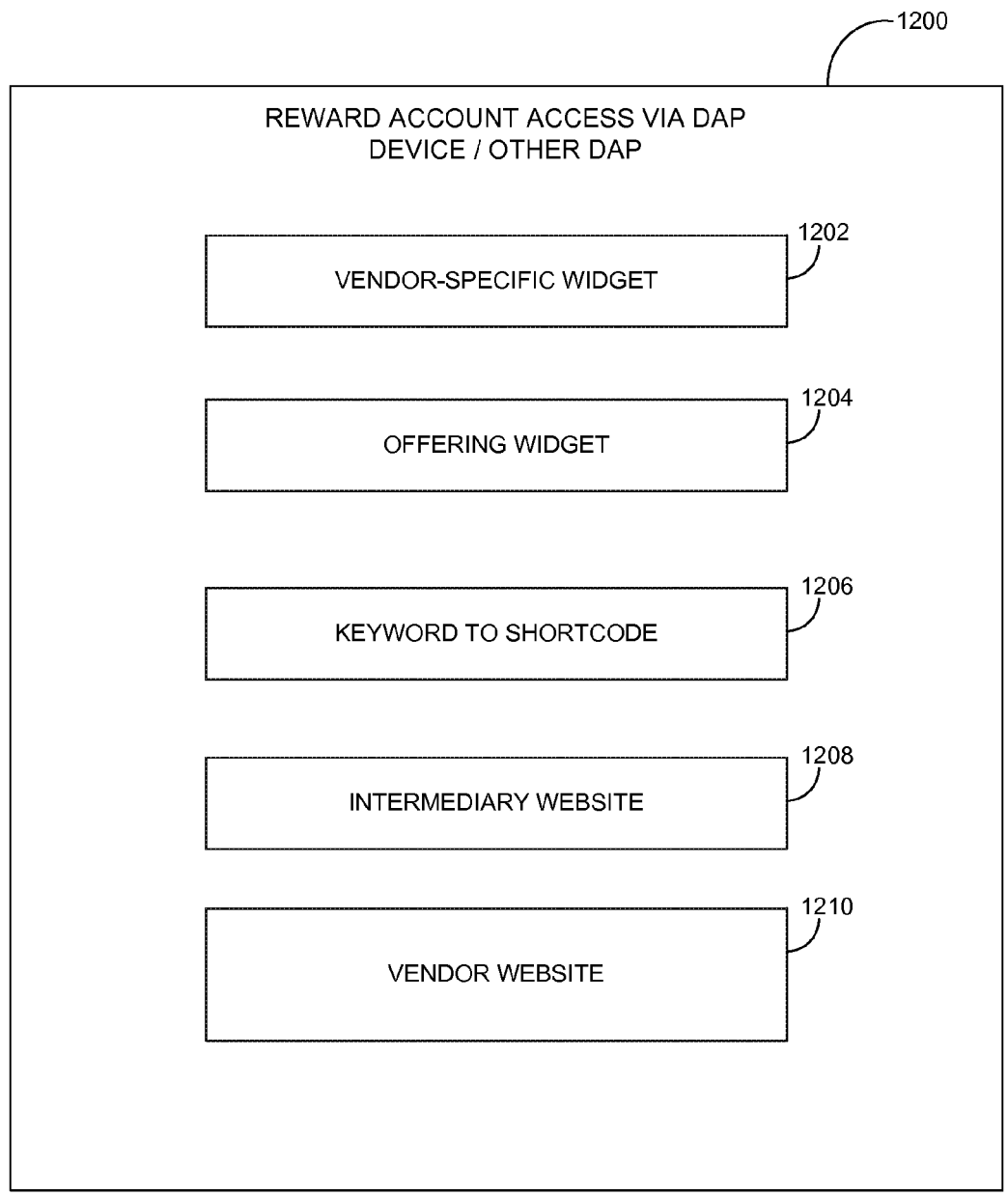
Figure 13A:
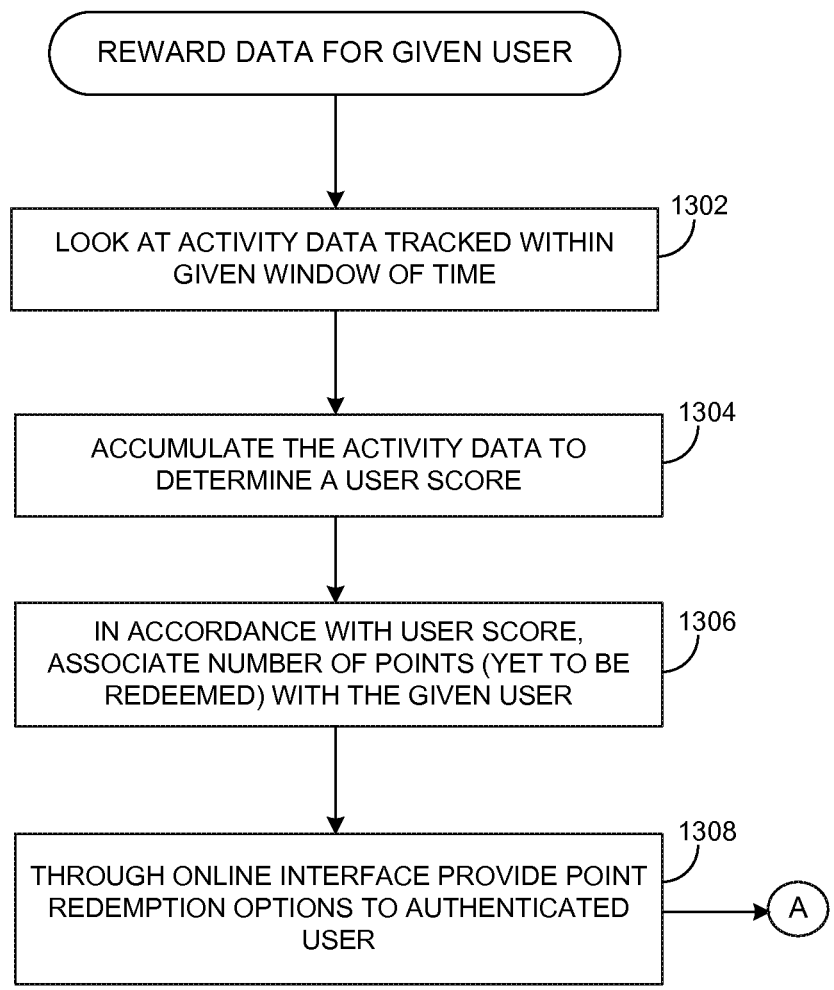
Figure 13B:
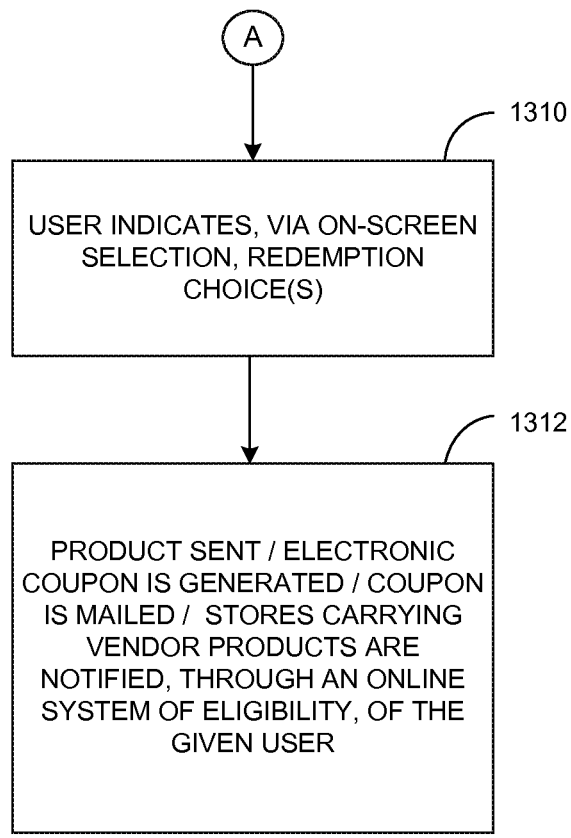

FIG. 9 provides schematic representations of graphical user interface elements that may be provided on a user DAP once a given offering has been deployed;

FIG. 10 provides schematic representations of other graphical user interface elements that may be provided on a target user DAP once a given offering has been deployed;

FIG. 11 provides schematic representations of other graphical user interface elements that may be provided on a target user DAP once a given offering has been deployed;

FIG. 12 provides schematic representations of graphical user interface elements that may be provided on a user DAP device as a result of deployment, to allow a target user to access reward account information associated with a given provider; and FIGS. 13A-13B illustrate a flowchart of a process by which reward data can be determined and attributed to a given user.

DETAILED DESCRIPTION

In accordance with one or more embodiments herein, various terms may be defined as follows.

Application program interface (API); and API interface. An API may be an operational interface of an application, by which the application can be invoked, and to or from which parameters can be passed. An API interface may include an API call that has both a path or channel for getting to a given API and a data-interchange format for passing one or more parameters to or from the API. An example HTTP-based API call a given mobile device might use to call upon an API at a remote system (e.g., accessible via the Internet when the mobile device is connected to the Internet) may be in the form of <URL>/<function>.<specified format> <parameters in specified format>. For example, the Twitter search request invokes the Twitter search API to return tweets that match a specified query. This API call uses a URL of http://search.twitter.com/search.json?call back=foo&q=twitter.

Application program. An application program is a program that, when executed, involves user interaction, whereas an operating system program, when executed, serves as an interface between an application program and underlying hardware of a computer.

Asset. An asset may include media content or an application program, which may itself contain media content.

Communications portal. A communications portal, per embodiments herein, may provide one or a plural set of unified access points, through which provider and target user DAPs can access a back-end system. A communications portal may be in the form of a web-based user interface and/or an API interface.

Consumer; and target user. While a consumer is a human or a human acting on behalf of a legal entity (e.g., a corporation) who purchases and consumes a product or service from a vendor, a target user is a human DAP user with which a provider wishes to exchange information and to which the provider wishes to provide aggregated assets in the form of an offering. A target user may have unique credentials to provide him or her access to a data access point (DAP), and a target user generally has the ability to configure the DAP.

Data access point (DAP). A DAP is a person-centric communications processing circuit with computing, human interface, and display abilities. A DAP may be specific to a particular DAP device, for example, a cell phone, or the DAP may be accessed via different DAP devices, for example, via a browser on a device having network access. A DAP may be configured so that only an authorized user can access the DAP. This limited access to the DAP may be controlled with a user credentials authentication engine accessible by the user via a human interface including one or more displayed authentication graphical input and/or output tools on the DAP device.

DAP (data access point) provisioning. DAP provisioning may involve a process of preparing and equipping a data access point so that it can provide services to its users. The provided services may include new services.

Data interface. A data interface is a physical signal carrying device and/or a data structure, and includes a standard data format known by (or implicitly abided by) each of a plurality of interfaced devices either taking data from another interfaced device or providing data to another interfaced device.

Data structure. A data structure is a way of storing and associating data on computer-readable media. A data structure may include a linked data structure that has data records (nodes) linked together by references (links or pointers). A data structure may also (or instead) include another type of data structure that requires one or more arithmetic operations on one or more pointers. An example of a linked data structure may be where a piece of data (node A) is associated with another piece of data (node B) by providing node A with a pointer that points to the location of node B. Media-stored data structures herein are computer-readable media (or portions thereof) encoded with linked or other data structures. Data-interchange formats such as XML, yaml, s-expressions, json, and atom are example collections of data structures used to facilitate exchanges of or sharing of data among machines.

Deployment; provisioning; installation; and package management. Deployment may include the installation of software, files, and data structures, at a back-end and/or at one or more node devices. Deployment may also include software upgrading, configuration, and removal at the back-end and/or at the node(s). Deployment may or may not involve compilation. Provisioning, installation and package management are various types of deployment. The term provisioning may refer to data access point provisioning (explained above) and/or mobile content provisioning (explained below). An installer is generally bundled with a particular software product, and generally only works with its bundled product. A package manager uses one or more central installation databases, verifies and manages plural packages, and can use one or more standard package formats. A package manager uses pre-compiled or preformatted packages. A deployment manger may utilize the following example algorithm. A user of one or more node devices requests or approves installation of software and files or aggregated software and files. The deployment manager determines the location or locations of programs, files, and data that will be needed, which may be in the form or one or more packages. The deployment manager fetches this data from one or more repositories. The deployment manager installs and configures the programs, files, and data, and manages the user interface at the node device(s) in order to prompt for and accept manual actions by the user at the location of deployment. Finally, the programs, files, and data are ready for use at the location of deployment. One or more standard installation or package management protocols may be employed to deploy software and data to one or more mobile phones in accordance with various embodiments herein. One example standard is J2EE client provisioning.

Interface. An interface includes hardware and/or one or more media-stored data structures interoperating with a machine (or both hardware and media-stored data structure(s)), configured to provide a connection. The connection is between at least two processing circuits to allow data or signals to be shared or transferred (or exchanged) among the processing circuits.

Mobile content provisioning. Mobile content provisioning involves delivering mobile content (programs, data, files). The mobile content may be delivered to varying types of mobile devices, for example, mobile phones, regardless of the particular operating systems or features of those devices.

Mobile operating system. Examples of mobile operating systems (mobile OSs) include a Java ME-based OS (e.g., DoJa and Sava Je), the Symbian OS, the iPhone OS, a BlackBerry OS, Windows CE plus Windows Mobile Middleware, a Linux-based mobile OS, the Palm OS, and Android.

Processing circuit (or process mechanism). A processing circuit may include both (at least a portion of) computer-readable media carrying functional encoded data and components of an active computer. The active computer is ready to execute (or is already executing) the functional encoded data, and thereby causes certain acts to occur. A processing circuit may also include: a machine or part of a machine that is specially configured to carry out a process, e.g., any process described herein; or a special purpose computer or a part of a special purpose computer. A processing circuit may also be in the form of a general purpose computer running a compiled, interpretable, or compilable program (or part of such a program) that is combined with hardware carrying out a process or a set of processes. A processing circuit may further be implemented in the form of an application specific integrated circuit (ASIC), part of an ASIC, or a group of ASICs. A processing circuit may further include an electronic circuit or part of an electronic circuit. Neither a processing circuit nor a process mechanism exists in the form of code per se, software per se, instructions per se, mental thoughts alone, or processes that are carried out manually by a person without any involvement of a machine.

Program. A program includes software of a computer process mechanism or a processing circuit.

User interface tools; User interface elements; output user interface; input user interface; input/output user interface; and graphical user interface tools. User interface tools are human user interface elements which allow human user and machine interaction, whereby a machine communicates to a human (output user interface tools), a human inputs data, a command, or a signal to a machine (input user interface tools), or a machine communicates, to a human, information indicating what the human may input, and the human inputs to the machine (input/output user interface tools). Graphical user interface tools (graphical tools) include graphical input user interface tools (graphical input tools), graphical output user interface tools (graphical output tools), and/or graphical input/output user interface tools (graphical input/output tools). A graphical input tool is a portion of a graphical screen device (e.g., a display and circuitry driving the display) configured to, via an on-screen interface (e.g., with a touch screen sensor, with keys of a keypad, a keyboard, etc, and/or with a screen pointer element controllable with a mouse, toggle, or wheel), visually communicate to a user data to be input and to visually and interactively communicate to the user the device's receipt of the input data. A graphical output tool is a portion of a device configured to, via an on-screen interface, visually communicate to a user information output by a device or application. A graphical input/output tool acts as both a graphical input tool and a graphical output tool. A graphical input and/or output tool may include, for example, screen displayed icons, buttons, forms, or fields. When user interface elements are presented herein, for example, schematically in a drawing, a corresponding media-stored data structure may exist or be created with which the user interface elements are interfaced.

Vendor; and provider. While a vendor provides, sells, and generally charges for a product or a service, a provider provides assets. A provider may be a publisher or any provider of assets or media content.

Wireless application protocol (WAP). A wireless application protocol is a specification for developing applications that operate over wireless communications networks. One type of wireless application protocol is the wireless application protocol architecture specification (WAPARCH) of the OMA (the open mobile alliance).

Referring now to the drawings in greater detail, FIG. 1 is a block diagram of a communications system 10 per one embodiment of the present disclosure. The illustrated communications system 10 includes a plurality of nodes 23 at a front-end, one or more back-end systems 24, and a communications portal 20 that both exchanges information among nodes 23 and back-end system(s) 24, and deploys or provides new and varied aggregations of assets to add, improve, or reconfigure how information is exchanged.

As shown in FIG. 1, nodes 23 may include a plurality of provider data access points (DAPs) 11 located at corresponding provider DAP devices 12, and a plurality of target user DAPs 13 located at corresponding target user DAP devices 14. Provider DAP devices 12 and target user DAP devices 14 include respective sets of network interfaces including one or more interfaces 13 and one or more interfaces 15.

Back-end system(s) 24 is (are) shown in FIG. 1 as including one or more provider interfaces 26, one or more target user interfaces 28, one or more offering engines 30, one or more opt-in engines 32, and one or more databases 33.

Each provider DAP device 12 is connected, via one or more of its interfaces 13, to provider interface(s) 26 via a wide area network (WAN) 18. Each of target user DAP devices 14 is connected, via one or more its interfaces 15, to target user interface(s) 28, also via WAN 18. WAN 18 may include one or more networks, including internetworks, at least portions of which may include the Internet. WAN 18 may include wireless and/or wired network connections.

Back-end system(s) 24 further include one or more deployment managers 34. In addition, the illustrated communications system 10 includes one or more repositories 17, which carry a plurality of assets 16, each of which is accessible via its repository through WAN 18. The repository or repositories 17 may or may not be part of back-end system(s) 24. They may be accessible by either back-end system or systems 24 or a given node device 23 through network access via WAN 18.

One or more embodiments of the present disclosure are directed to an information exchange system for exchanging information between providers and target users via their data access points (DAPs). Improved configuration tools may be provided for configuring the target users' DAPs (or their DAP devices). These configuration tools may include an offering engine (or engines) that may be configured to allow different providers to aggregate and configure unique sets of assets (applications, communications applications, and media content). Each unique set of assets may have been uniquely aggregated and/or configured by a given corresponding provider via the provider's computer (e.g., a DAP), or, per an alternate embodiment, by a given corresponding plural set of providers via their respective computers (e.g., DAPs). The communications applications may include synchronous and asynchronous conferencing applications. These unique sets of assets may be offered to target users as offerings that may be selectively adopted by individual target users for deployment at their target user DAPs.

In the illustrated embodiment shown in FIG. 1, communications portal 20 includes a provider interface (or plural provider interfaces) 26 and a target user interface (or plural target user interfaces) 28. Provider interface 26 is configured to present provider graphical user interface tools on remote provider DAP devices 12, which devices are remote from back-end system 24. These graphical user interface tools are presented on a given remote provider DAP on provider DAP device 12 of a given provider.

The provider graphical user interface tools that are presented on the given remote provider DAP device 12 are presented on the device's display. Those tools may include, for example, "provider selectable assets" screen inputs configured to receive asset selections from the given provider and "asset location and identifying data" screen inputs configured to receive data locating and identifying assets selected by the given provider. They may also include "user communication configuration" screen inputs configured to receive user communication configuration parameters specifying ways that a given target user, using his or her target user DAP 13 via a target user DAP device 14, can communicate with a given provider via communications system 10.

The user communication configuration parameters may include, for example, SMS or MMS keyword-response pairs; a widget with synchronous and/or asynchronous conferencing elements; and user authentication requirements. In addition, or alternatively, the user communication configuration parameters may include one or more URLs a target user may visit to conduct a web-based information exchange with the given provider, and/or email options. The one or more target user interfaces 28 may be configured to present target user user interface tools (e.g., graphical user interface tools) on a display of a remote user DAP device 14 remote from the back-end system(s) 24.

The target user user interface tools may represent offering opt-in and user configuration options. Those options may include "opt-in" screen inputs configured to receive an indication that the given target user is opting in to receive the offering, and they may also include "asset configuration" screen inputs configured to receive asset configuration parameters from the given target user. In accordance with one specific embodiment, the opt-in screen inputs may include download screen inputs with which a given target user may interact to cause assets of the offering to be downloaded to the given target user's DAP (or DAP device).

One or more offering engines 30 are provided to manage the offering setup by providers, which involves (per one embodiment) plural providers respectively and independently aggregating and configuring their own unique sets of assets for particular offerings. In the process of creating, editing or otherwise modifying an offering, one or more offering engines 30 produce or modify offering data 42, which is stored in one or more back-end databases 33.

One or more opt-in engines 32 are provided to manage the process by which different users can opt-in (for example, download) one or more offerings associated with or offered by one or more different providers, and then to deploy each selected offering. Deployment may include causing the installation of the assets of each selected offering on the given target user's DAP device 14. Engines 32 also facilitate the communication between the given target user's DAP at the given target user's DAP device 14 and back-end system 24, thereby facilitating an information exchange between the given target user and the given provider that offered the opted-in offering.

When a given target user opts-in for a particular offering, opt-in engine(s) 32 generate(s) opt-in data 40, which is stored in one or more back-end databases 33.

One or more deployment managers 34 may be provided to manage the deployment of the offerings for different target user DAPs. Meanwhile back-end system 24 identifies and obtains assets and asset information, creates and tracks user accounts, creates and tracks vendor accounts, accumulates reward information, and facilitates the interaction between target users via their DAPs on the one hand and the illustrated back-end system 24 on the other. In the process of performing these tasks, back-end system 24, for example, via tracking processing circuits (not specifically shown) in offering engine(s) 30 and opt-in engine(s) 32, produces information exchange data 44. Information exchange data 44 accordingly includes data structures for each of asset information data 70, user account data 72, provider accounts data 74, reward information data 76, and user interaction data 78. Depending upon the state of the illustrated back-end 24, these information exchange data structures may be populated with the corresponding data 44, or they may be empty.

Asset information 70 may include information regarding the identities of assets, the locations of those assets, and other information associated with respective assets, for example, particular target users, providers, and/or offerings associated with the respective assets. User accounts data 72 includes user authentication information for respective target users for purposes of accessing communications portal 20. Provider accounts data 74 includes provider authentication information for respective providers for purposes of providing them with access to communications portal 20. Reward information 76 includes reward information concerning the types of reward data to be recorded, the types of target user activity data records that need to be maintained and populated in order to make reward eligibility determinations, and other reward configuration and selection information particular to or associated with particular providers, target users, and/or offerings. In addition, information exchange data 44 may include user interaction data 78, which includes information regarding how various target users can interact with communications portal 20 and access, modify, and/or provide data concerning his or her reward information and certain offerings opted-in and configured by the target users via their DAPs.

A given provider, upon aggregating and configuring a unique set of assets in the form of a given offering, will generate, in cooperation with offering engine 30, offering data 42. That offering data 42, in the illustrated embodiment, includes the chosen assets 60 to be provided in the offering, certain associated access data 62, user data 64, configuration parameters 66, and other parameters 68. The chosen assets 60 may include data identifying particular assets or asset types to be provided in an offering. For example, a given provider may choose from among a set of available assets including one or more of wallpaper, ringtone, address book contact entries, event data and/or an event application, bookmark information, a ringback file, one or more photo or photo gallery files, one or more widgets, location information compatible with a geographical mapping application on the target user DAP, notifications, and certain provider-specific icons (for example, including icons incorporating one or more of the logos of a given vendor, which may be the given provider). Associated access data 62 may include asset identifiers and location information (e.g., network links) specifying where a particular asset may be found and accessed. User data 64 may include information about the types of target users and/or specifically identified target users eligible for respective offerings.

Configuration parameters 66 include those parameters established by the provider to configure the assets in the given offering. Other parameters 68 include any other parameters that might accompany a given offering, e.g., devices, device operating systems, or platforms to be supported, and parameters specifying how potential users might be notified about a given offering or be able to opt-in to the given offerings.

A given user may generate, in cooperation with opt-in engine 32, opt-in data 40. Opt-in data 40 includes sign up data 50, chosen offerings data 52, chosen assets data 54, and configuration parameters 56. Sign up data 50 may include data provided by a given user as a result of the given user signing up to get access to an offering via the communications portal 20. Chosen offering(s) data 52 may include indications of the offering or offerings chosen by a given target user. Chosen assets data 54 may indicate those assets chosen by the target user from among the complete set of assets made available in a corresponding (chosen) offering. Configuration parameters 56 are parameters that may be specified by a given user to customize the way the given offering will be deployed on his or her DAP.

Figure 2:
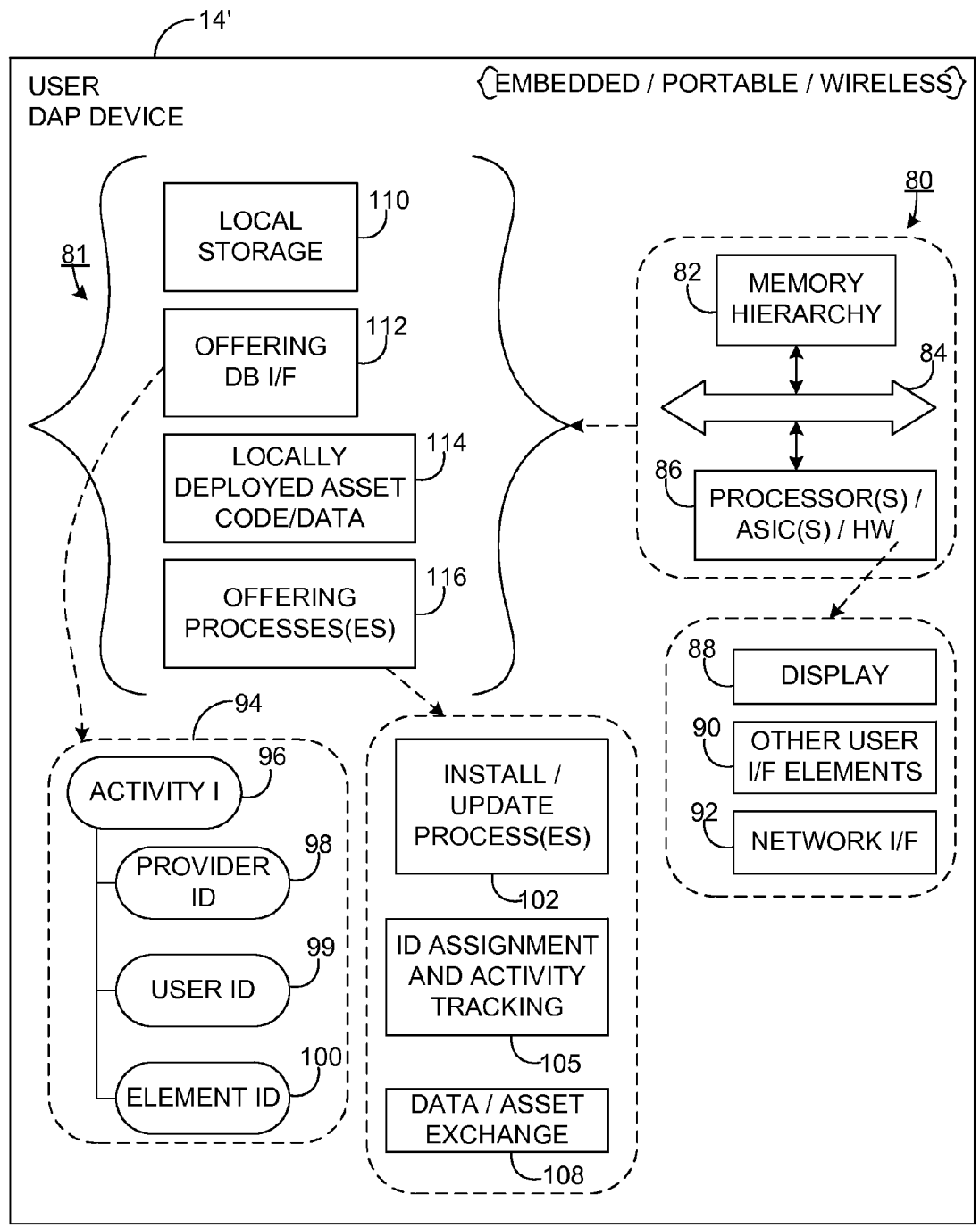
FIG. 2 is a schematic diagram of select elements of a data access point (DAP) device.

FIG. 2 is a schematic diagram of select elements of a target user DAP device 14'. The illustrated target user DAP device 14' may, for example, include an embedded device, which may be portable and which may includes a wireless device. By way of example, the target user DAP device 14' may include a mobile phone, a personal digital assistant, and/or a handheld email device. Generally, a target user DAP device is a device with computing, display, and input/output capability. In addition, a DAP device may include one or more network interfaces configured to connect to a wide area network. For example, a network interface may be provided that includes a wireless WAN connection interface. In addition, the target user DAP device 14' may be a camera with processing, display, and data input capabilities. If the DAP device is a mobile device, it may use a particular mobile operating system (OS), which in some cases may incorporate or interface with a runtime environment for network-connectable mobile devices (e.g., Java ME or BREW).

As shown in FIG. 2, the illustrated target user DAP device 14' includes certain processing circuitry. In the embodiment shown in FIG. 2, that processing circuitry includes hardware elements 80 and code elements 81. The illustrated hardware elements 80 include a memory subsystem 82, a bus 84, and processor(s)/ASIC(s)/other hardware 86. As shown in FIG. 2, the other hardware may include a display 88, other user interface elements 90, and network interface circuitry 92. By way of example, display 88 may include an LCD or other type of computer display or device display. Other user interface elements 90 may include, for example, a keypad, soft keys, touch screen elements, and pointing devices such as roller balls, rotatable discs, and the like. Meanwhile, network interface 92 may include network interface hardware and driver software encoded on machine (or computer)-readable media and configured to interact with the interface hardware to cause, for example, wireless protocol communications with a wireless network. Network interface 92 may include other types of wireless or wired network interconnection and protocol features.

Code elements 81 include other code aspects of the select processing circuitry shown in FIG. 2, including data, data structures, and programming code for an offering deployed at the illustrated target user DAP device 14'.

These data, data structures, and programming code include local storage 110, an offering database interface 112, locally deployed asset code and data 114, and one or more offering processes 116.

Local storage 110 includes local data, data structures, and/or code pertaining to the given offering as deployed. Offering database interface 112 provides certain database management, interfacing, and API calls to facilitate the distributed management or interchange of data between the given user DAP device 14' and any remote database or databases.

Local storage 110 may include, for example, a local package database that stores package metadata used to facilitate the installation of packaged assets on target user DAP device 14'.

Offering database interface 112 may include, or may refer to and populate, a tracked activity data structure 94 that is configured to hold certain data pertaining to a given offering. An activity identifier 96 is provided for each tracked activity (Activity i; i={0, 1, 2, . . . N}) within a deployed offering, which identifies a particular activity of an asset within the deployed offering. Certain data elements may be tracked that correspond to each tracked activity. A provider identifier 98 is provided which identifies, for activity i, the provider that made the offering available to the given user. A user identifier 99 is provided which identifies the given target user using user DAP device 14'. An element identifier 100 is provided which identifies the particular asset or asset element for which the activity is being tracked.

Locally deployed asset code and data 114 may include locally deployed portions of the assets that form part of the deployed offering. Those asset portions are the portions that are locally deployed, i.e., within the target user DAP device 14'. It is to be expected that certain assets might take up substantial amounts of DAP device resources (e.g., active memory or bandwidth) if located and executed entirely on target user DAP device 14'. Therefore, certain portions of the asset code and/or data of asset code and data 114 may reside remotely from target user DAP device 14' and be remotely accessed, e.g., via a URL link or an API call. For example, a given asset may include a widget which provides certain interfaces (including API interfaces) to one or more other applications remote from target user DAP device 14'. Thus, one or more API interfaces may be part of locally deployed asset code and data 114, and those API interfaces may communicate with an API of an application that is remote from target user DAP device 14'.

Meanwhile, offering process or processes 116 may include, for example, install/update process or processes 103, identifier assignment and activity tracking processes and data 105, and data and asset exchange processes 108.

Install/update processing code 103 may include code for install and update processes that include a discovery application to locate packages or application updates at a particular portal. In the illustrated system, the portal includes the communications portal 20 shown in FIG. 1, and code 103 when executing communicates with the deployment manager or managers 34 shown in FIG. 1. Identifier assignment and activity tracking code 105 when executed may carry out processes including assigning and tracking identifiers corresponding to particular activities, in the form of the tracked activity data structure 94.

Data/asset exchange code 108 when executed facilitates the exchange of data in both directions between a target user (a consumer in alternate embodiments) uniquely assigned to the data access point of target user DAP device 14' and a provider (which may be a vendor of a particular product, service, or media content, in certain embodiments). During this exchange, in the illustrated embodiment, when data is provided to the user, this data may include assets and reward information. In the illustrated embodiment, when data is provided to a particular provider, this data may include monitored brand loyalty activity and user behavior data. Brand loyalty activity and user behavior data may be saved and/or shared with a provider in an anonymous form so that the identity of the target user cannot be ascertained from the data.

As stated above, ID assignment and activity tracking code 105 when executed assigns identifiers to particular activities of interest of a given target user using target user DAP device 14'. These activities may involve use of a particular asset provided as part of the given offering.

ID assignment and activity tracking may be carried out in accordance with the following example algorithm. As each asset is installed on a target user DAP device 14' for a given offering, the metadata associated with that asset (which may be in the form of a program or file) may be modified to include one or more unique identifiers for that program or file and for specific elements thereof to be tracked. Moreover, certain types of activity indicators will be identified as part of the metadata associated with the asset and/or asset element. Meanwhile, all of the assets (and their elements) associated with a particular offering will be associated with the provider identifier and user identifier.

As activities concerning select asset elements are tracked, any resulting metric data is tracked and recorded in a local or remotely deployed database. These activities (Activity i (i=0, 1, 2, . . . )) may be recorded in the form of tracked activity data structure 94, and when they are so recorded, they may be associated with corresponding activity identifiers 96, provider identifiers 98, user identifiers 99, and element identifiers 100.

FIG. 3 shows a flowchart of one or more DAP offering processes that may be carried out, and shows a schematic representation of a given offering 130 produced as a result of the processes. The illustrated processes are carried out, in the illustrated embodiment, by the communications system 10 shown in FIG. 1.

In an earlier act 120, a given vendor offering is configured by a provider, using a provider DAP device 12 to interact with a provider interface 26 as shown in FIG. 1. This offering may be configured and stored in one or more databases from among databases 33 of the system 10 shown in FIG. 1.

In a later act 122, upon the occurrence of an opt-in by a given user with the use of his or her target user DAP device 14, information exchange data for that offering is converted and stored. This information exchange data includes opt-in data 40 and offering data 42, each schematically shown in FIG. 1. When this data is converted and stored, it may, for example, be stored within one or more databases of databases 33 of back-end system 24.

Afterwards, at act 124, node device code and back-end code are each prepared. When this code is prepared, it is stored in database or databases 33, and it includes, for a given offering, node device code 132 and corresponding metadata 134 and back-end code 136 and corresponding metadata 138. This combined data for a given offering may be considered part of a package to be deployed, which may be managed by one or more deployment managers 34 of system 10 as shown in FIG. 1.

Deployment manager or managers 34 may include, for example, one or more package managers. These package managers create and then refer to groups of files. Each group of files includes files for a particular program (or asset) and corresponding metadata. The corresponding metadata may include dependency information as well as a program's name, a description of its purpose, version number, the vendor or provider associated with the program, a checksum, and a list of dependencies necessary to properly run the program.

When the information exchange data is converted and stored, it may be converted to different formats for different types of DAP devices. This "conversion" may involve converting one set of code to a differently compiled or differently configured version of the code for different types of DAP devices. The types might include, e.g., mobile phones utilizing mobile OSs such as Symbian, RIM (blackberry), WinMo, Android, and iPhone. Alternatively, different versions of the asset code, packaging code, and deployment code may be gathered for different types of devices, and different sets of the combined information exchange data may be set aside for different types of devices.

When the node device code 132 and back-end code 136 are prepared, this may involve packaging both the node device code and the back-end code, which may include (if/as necessary) compilation of the code.

FIG. 4 is a block diagram that shows an example distribution of select processing circuits, databases and data in a system such as that shown in FIG. 1. In simplified form, the diagram of FIG. 4 includes block representations of a given customer DAP device 14", one or more back-end systems 24', and data processing and storage systems 150 with which each of customer DAP device 14" and back-end systems 24' is connected and intercommunicates. The illustrated processing and storage systems 150 include one or more third party processing and storage systems 152, one or more vendor processing and storage systems 154, and one or more intermediary processing and storage systems 156.

Local processes 200 of customer DAP device 14" may, as shown, be interfaced with remote applications via one or more APIs 300 on back-end system or systems 24'. APIs 300 may then interface with software or processes running on one or more of third party, vendor, and intermediary processing and storage systems 152, 154, and 156. As to database functionality, one or more local databases 202 may be provided on customer DAP device 14", which interface with remote databases 302, which may be part of back-end system or systems 24' or may be portaled somewhere at back-end system or systems 24'.

Any one or more of local processes 200 in the embodiment of FIG. 4 and of code elements 81 in the embodiment of FIG. 2 may be implemented in accordance with a given wireless application protocol specification, e.g., in accordance with WAPARCH of the OMA.

FIGS. 5A-5C include flowcharts of an embodiment of a provider interface process carried out by one or more provider interfaces 26 (FIG. 1) when an offering is configured by a given provider via the given provider's DAP 11. The illustrated process when executed forms a processing circuit.

In an early act 502, a main/login page is presented on a provider's DAP device 12 display. At main/login screen at act 502, the screen may include authentication graphical tools, e.g., username and password graphical tools (not shown). Per other embodiments, non-graphical authentication user interface tools may be employed. The authentication graphical tools may be graphical input/output tools, whereby they provide information to the provider indicating the type of information to be input, and accept input actions by the provider. The username graphical tool may include a textual input field, and the password graphical tool may also include a textual input field. In this regard, a given provider may be provided with only one unique login account, and be allowed to provide his or her account credentials through a web-based interface, provided by, for example, one or more provider interfaces 26 of the communications system 10 shown in FIG. 1.

The main/log in screen at act 502 may include additional authentication graphical tools in addition to the username and password graphical tools described above. Such additional authentication graphical tools may be part of the same page, or may be presented to the user with the use of an access wizard. Such a process could allow, via a computer screen input, a provider to provide information including the company name, contact email, contact address, contact phone, contact mobile phone, password, confirm password, and secret question and answer data, via respective graphical input tools for those types of data. The provider interface process may also allow for a provider to click on a "forgot password" graphical input tool, which would then allow the providers to be presented with graphical input tools allowing a secret question to be asked of the provider whereby the provider can input the secret answer to the secret question. Upon submission of such an answer, an informative page may be displayed, and a host-generated email may be sent to an email address on file for that provider with a link back to a site allowing for a password for authentication to the provider interface to be reset.

In a subsequent act 504, the provider is taken to an authenticated landing page. The authenticated landing page rendered at act 504 (e.g., by provider interface 26) may include a graphical user interface element 5040 (for example, in the form of a page, window, or other screen or display based user interface element). The illustrated graphical user interface element 5040 includes graphical I/O tools 5041 and 5042.

Graphical I/O tool 5041 is an "existing offerings" graphical user interface tool that displays a selection available to the DAP provider, via his or her screen, to choose from one or more existing offerings previously configured by that same provider. Graphical I/O tool 5042 is a "new" graphical user interface tool that communicates the new option to the provider, and that can be interacted with via the DAP device screen to indicate (to the process) the provider's choice to create one or more new offerings.

Provider information is input at act 506, at which point the provider may input information about the provider, via a graphical interface tool on his or her screen, such as company name, the first and last name of a contact at the company, and any other contact information including address, city, state, zip or postal code, country, website, main phone, username, password, work phone, mobile phone, email, fax, and/or other pertinent information.

In accordance with one embodiment, at each of the user interface elements presented on the provider's DAP device screen, a unique web page may be provided that includes a next button for proceeding on to a next page.

In a later act 508, the provider is allowed to make selections for target device platform or cross-platform compatibility, whereby the assets of the given offering are to be made compatible with or among the selected target devices. For example, certain types of mobile phone DAP devices may be supported, including, for example, the Symbian, RIM, WinMo, Android and Apple mobile phones. Per another embodiment, other platforms may be supported, including, for example, user authenticated web portals such as iGoogle. Accordingly, a given user may be allowed to provide some or all of the same assets of a given offering on their mobile phone, which may, for example, be either a BlackBerry phone or an iPhone, and also on their chosen web portal (e.g., iGoogle) and thus be able to access the assets on any networked PC.

In the illustrated embodiment, when act 508 is performed, a graphical user interface element 5080 may be presented to the provider on the provider DAP device display, allowing the provider to select among certain supported mobile devices, including, for example, Symbian, RIM and so on. As shown in the graphical user interface element 5080 in FIG. 5A, the provider may view information on the screen identifying choices for selection, e.g., including text identifying the types of devices or platforms to be supported. In the example, Symbian and RIM mobile phones are shown with circular toggle selection indicators and pictures of the phones (called phone PICs).

In a subsequent act 510, the offering setup is commenced by the provider, at which point the asset types to be provided as part of the offering are selected. At this act, a graphical user interface element 5100 may be displayed to the provider on the provider DAP device. The optional assets that can be selected may be depicted with text, icons, pictures, or other graphical indicators communicating the choices to the provider, and by providing graphical input tools corresponding to those indicators, which include circular toggle inputs in the illustrated embodiment. A given one of the illustrated toggles may, when selected, either result in a given asset being included in the offering or cause a subsequent set of graphical input tools to be presented thereby allowing the provider to specify additional parameters regarding the asset or assets to be included in the offering. The assets that may be selected may include, for example, per the embodiment shown in FIG. 5A, wallpaper 5101, ringtone 5102, contact 5103, events 5104, bookmark 5105, ringback 5106, photo gallery 5107, widget 5108, one or more locations 5109, notifications 5110, icons 5111, and so on.

When wallpaper is selected via wallpaper toggle 5101, certain wallpaper, e.g., hand-picked by the provider as part of the offering, may be placed on the given target user's DAP. When a ringtone is selected via ringtone toggle 5102, a particular ringtone or set of choosable ringtones may be included in the offering which can be chosen by the target user on their data access point device. When the contact toggle 5103 is chosen, the offering may include one or more provider-specific contacts (e.g., address and other contact information of a salesperson employed by the provider).

When events are chosen as selected assets via events toggle 5104, the provider may be able to provide one or more calendar event objects—either as entries compatible with the target user DAP calendar application, or packaged with a calendar application. The asset may also include an update/add program by which the provider can update a given calendar entry or add new entries at a central location, whereby that new data will be pushed to or pulled from a process on the target user's DAP.

When a bookmark asset is selected via bookmark toggle 5105, one or more bookmarks may be included in the assets to be deployed to a target user DAP. One bookmark might be the website for the provider. When a ringback selection (via ringback toggle 5106) is included as part of the assets to be part of the offering, the asset may include a program and an associated sound file. For example, when the offering has been deployed and the given target user places calls to the provider, the user will hear a ring sound that is unique to that provider. One or more photos or a photo gallery may be selected for inclusion in the offering upon selection of photo gallery toggle 5107, in which case they will be added to the target user's DAP upon deployment.

A widget may be selected (by clicking while a cursor is over the widget toggle 5108, in the illustrated embodiment), in which case a widget may be provided as part of the assets to be deployed. In addition, one or more locations of the provider may be selected via location(s) toggle 5109, and thereby included in the offering, e.g., in the form of map data that is compatible with a certain GPS and/or map application on the target user DAP. Select types of notifications may also be selected for deployment as assets via the notifications toggle 5110, whereby, upon deployment of the offering, the given target user may be provided with a subscription to a third party notification service. Certain icons may also be included in the offering upon selection of icons toggle 5111, so that the user can configure their DAP to have those icons to control one or more features of the DAP.

In a subsequent act 512, the provider continues to setup the offering, and specifies asset locations and/or identifiers. For example, the provider may do this by interacting with a graphical user interface element 5120, which in the example shown in FIG. 5B includes graphical I/O tools for wallpaper 5121, for ringtone 5122, for contacts 5123, for events 5124, for bookmarks 5125, for a ringback 5126, for a photo gallery 5127, for a widget 5128, for one or more locations 5129, for notifications 5130, for icons 5131, and for other assets not specifically shown.

In act 512, when the provider is specifying asset locations and identifiers, the provider may do so via a graphical user interface element, as shown. The type of graphical user interface element used may vary depending upon the type asset being located or identified. Alternatively, the type of graphical user interface element and data that is provided for location and identification of the asset can be the same across all of the assets. By way of example, the graphical user interface element for wallpaper 5121 includes a browse input field, including a button which can be triggered by the provider in order to cause browse access to browse files assessable via the provider interface to identify a particular file of a wallpaper image. A browse/input field for ringtones 5122 may be provided. The graphical user element for contacts 5123 includes a short code input. The graphical user interface element for events 5124 is a field for inputting a URL to a desired calendar having the events to be included in that asset. Next to the URL field input for events 5124, instructions may be displayed indicating for example, "please enter the URL path to your calendar".

The graphical user interface element for bookmarks 5125 may, for example, include a field for inputting a vendor site URL, which indicates the URL for a particular vendor.

The graphical user interface element for ringback 5126 may include a browse/input field. The graphical user interface element for the photo gallery 5127 may include, for example, a browse/input field. The graphical user interface element for a widget may include a field for inputting either a feed URL or location information for locating the widget. The graphical input element for location 5129 may include a field for locating a path to a location database. The graphical user interface element 5130 may include a field for inputting a path to a service API. The graphical user interface element or elements for icons 5131 may include, for example, a browse/input field. When providing location or identifier information for a widget at graphical user interface element 5128, inputs may be provided to allow for certain needed information. For example, if the widget is a basic RSS feed, which includes refresh, previous, next, and search actions, a path may be specified to an existing widget created by a third party vendor. Example of types of supported widgets might include Java and WRT.

Locations needed for widgets may include a path to an existing location database with LAT/LON data, and a delimited spreadsheet of POI information to upload. Location information for notifications may include a path to a notification service API, and options for manual, automated, or both manual and automated notifications.

Upon input of the information in graphical user interface element 5120, a next button may be provided on the screen, at which point the computer will upload all of the location and identification information, upload the files identified thereby, and move to the next page of the provider process.

In a next act 514, the provider process prompts the provider to provide certain data in order to configure certain user communication functions and assets to be deployed to a given target DAP. One or more communication features e.g. email functionality 5140 may be part of the assets in a given offering. In addition one or more communication related widget elements 5142 may be provided as assets as part of a giving offering. The provider may be presented with one or more graphical user interface elements 5140 and 5142 for purposes of configuring these communication assets. In addition, user communication assets configured at act 514 may include short code response configuration data which the provider may provide by interacting with a graphical user interface element 5141 (for example, in the form of a page, window, or other screen or display based user interface element).

The illustrated keyword response graphical interface element 5141 includes graphical I/O tools for a keyword information 5143, keyword score 5144, keyword find 5145, keyword help 5146, a keyword rewards 5147, and a keyword buy 5148. In addition, a graphical input/output tool may be provided including text identifying a keyword-response file 5149 and a corresponding browse/input field 5150 Each of the keywords provided, for example, in keyword response graphical user interface element 5141, has a corresponding input field for the response that may be provided by the backend 24 upon a target user (via his or her target user DAP device 14) sending the keyword. The provider can accordingly configure what the response will be in response to each of these keywords (and or others) by inputting that response within the corresponding input field in graphical user interface element 5141. By way of example, a response by include up to 160 characters.

In a next act 516, the provider process prompts the provider to provide information regarding the point structure by which a given target user will be rewarded with certain points in accordance with certain actions by that target user, which actions are generally related to the target user's use of certain assets deployed as part of the given offering on the given target user's target user DAP device. For this purpose, a corresponding point structure graphical user interface element 518 may be presented to the provider, for example, in the form of a page, window, or other screen or display based user interface element. The illustrated point structure graphical user interface element 518 includes, among other elements, a number of sets of point triggers and related data explaining the points per trigger. A given element may, for example, be a particular asset or a particular function within an asset deployed on a given target user DAP device. The simplified schematic version of the point structure graphical user interface element 518 includes two elements, including element 1 and element 2. Element 1 has one or more point trigger fields 5181 for specifying events that will trigger points corresponding to element 1 and one or more point fields 5182 for inputting the number of points per associated trigger 5182. Element 2 has one or more point triggers 5183 and corresponding fields for inputting points per trigger 5184. By way of example, for a given keyword-response asset being deployed on a target user DAP device 14 a point trigger might be that the target user sends the keyword to the backend 24 of communication portal 20 a certain number of times. Another point rigger might be that a widget link is active for a certain amount of time, for example, 15 minutes. When the widget link is active for a longer period of time, for example, an hour, a higher number of points may be allotted to that given target user. Other example assets for which point triggers may be defined include event view, location find, use of a notification, use of a ringtone, and so on. Any asset of interest may be used to define a point trigger, and different point units and amounts of points can be specified by the provider through the point structure graphical user interface element 518. The point structure graphical user interface element 518 may be provided with a graphical user input tool for specifying the type of action associated with a particular asset leading to points, for example, the provider may be able to specify that points are allotted when a particular asset is active, by checking off a particular toggle or switch.

Actions must be captured based upon the basic and custom elements that are provided on a given target user DAP device as part of a given offering as opted in or configured by that target user. The point structure graphical user interface user element 518 may be configured so that a list of rewarded actions for a particular given offering that has been set up by that provider is dynamically generated, so that the corresponding point structure information can then be input by the provider in a way that it relates to the offering. Alternatively, a fixed list of selectable assets, point triggers for those assets, and points per trigger can each be generated and presented on the point structure graphical user element 518, but select elements within that fixed list may be grayed out preventing input of data for those grayed out items because they are not part of the given offering or do not include assets that will be part of the given offering.

In a next act 520, the provider is provided with prompts for allowing the input of information to configure the user profile information to be captured in connection with a given offering. That user profile information may include, for example, the target user's name, password, age, sex, zip code, mobile number, and so. Accordingly, corresponding graphical input/output tools may be provided for allowing the provider to specify these user profile elements to be captured upon the given target user opting in for and configuring the given offering for deployment on his or her target user DAP.

In a next act 530, the providers are presented with a graphical user interface element to allow the provider to configure usage data for reporting and for data collection. Accordingly, a report/collection graphical user interface element 5300 may be presented to the provider in the form of a page, window, or other screen based user interface element. The illustrated user interface element 5300 includes configurable parameter tools for usage 5301, configurable parameter tools for engagement 5302, and configurable parameter tools for demographics 5303. For example, by clicking a toggle for usage 5301, the provider may specify that a usage report is to be generated. By clicking the toggle next to engagement 5302, the provider may specify that an engagement usage report is to be provided. By clicking the toggle for demographics 5303, the provider may indicate that a usage report is to be generated for demographics. When a particular usage report is chosen, the given offering is configured so that when it's the deployed it will accumulate the appropriate data that will be required for that report. Graphical input/output tools are provided for specifying parameters relating to each of the chosen usage reports. For example, for the usage category, parameters may be specified through the use of graphical input/output tools for uniques 5310, for click throughs 5311, for CTRs 5312, for phone type 5313, and for page views 5314. The graphical tools for usage reports engagement parameters include graphical tools for total time 5315, time per user 5316, phone type 5317, total per element 5318, and time per user/element 5319. The graphical tools for demographic reports parameters include age 5320, sex 5321, phone type 5322, zip code 5323, and carrier 5324. Upon completing the input of data through the use of a page version of graphical user interface elements 5300, a next button may be pressed by the provider to take the provider to the next stage of the of the provider process, at which point act 532 may be carried out, at which point the content for the given offering may be reviewed by the provider.

In the configuration of the usage data to be collected and/or reported at act 530, other graphical tools may be provided to allow a provider to customize the types of information that can be gathered and reported. For example, a provider may specify that it wishes to know the geographic location of certain target users while they interact with particular assets, for example, when a target user uses the calendar with respect to a particular issue or to find or lookup events relating to the provider.

In the content review at act 532, each of the records and corresponding fields associated with all of the offering configuration data specified so far by the provider may be displayed to the provider via a computer screen element. In addition, or alternatively, sample example implementation screen shots, showing how a deployed target user DAP device may appear when the given offering has been deployed, may be presented on the via computer screen display to the provider to give the provider an idea of the look and feel of the given offering as ultimately deployed. By way of example, a graphical user interface element (not shown) may be presented to the provider which asks the provider to review the content element for the given offering and make any changes by interacting with certain graphical user input/output tools provided on the screen.

In a next act 534, one or more screens may be presented to the provider to facilitate content packaging. At act 536, the provider is returned to a landing screen. One or more graphical user interface elements may be provided to allow a provider to download compiled files or to copy or paste URLs to files relating to a given offering to the provider's own computer system.

The provider may be provided with a graphical user interface element that will allow the provider to edit content for a given offering. The edit graphical user interface element may include one or more graphical user input tools to allow the selection of the types of information to be edited for the given offering, and to allow the input of the edited new, or revised information for each of those elements. This edit process may allow a given provider to either create a brand new offering and rename this offering by editing an existing offering, or to indicate changes to an already deployed offering, and trigger the update or pushing of offering updates to target users that have opted in for the offering.

FIGS. 6A-6B include flow charts of an embodiment of a target user interface process carried out by one or more target user interfaces 28 (FIG. 1) when an offering is deployed, opted in, and configured by a given target user via, for example, a given target user's DAP 13, or another access node. The illustrated process, when executed, forms a processing circuit.

In an early act 602, an opt-in process is carried out. At act 604, an interface is downloaded, at which point a download graphical user interface element 6040 is presented to the target user. The download graphical user interface element 6040 may, for example, be in the form of a page, window, or other screen or display based user interface element. This graphical user interface element 6040 includes a communication to the target user to select an appropriate download for the offering selection, and to provide data to facilitate that download. A number of different target user DAP device types may be identified on download graphical user interface element 6040. For example, the offering may be offered for different types of mobile phones. Example types of mobile phones shown in the simplified download graphical user interface element 6040 include Symbian and RIM mobile devices. A toggle button is indicated for each of these mobile phone devices, to allow the target user to select the mobile device type for download. For each of the mobile phone types shown, including Symbian and RIM, a corresponding set of graphical I/O tools is provided. For the each of the Symbian and RIM mobile device types (and for others not specifically shown) a corresponding set of corresponding I/O tools is provided. Format type tool 6041, download trigger tool 6042 and path information tool 6043 are provided for the Symbian device, and format type tool 6044, download trigger tool 6045, and path type tool 6046 are provided for the RIM device.

At a next act 606, the target user selects the download button for the appropriate device. At a next act 608, the target user provides information, including information for configuring the offering and certain required data for the deployment of that offering on the target user's DAP device 14. At this act 608, an asset selection graphical user interface element 6080 may be rendered, for example, in the form of a page, window, or other screen or display based user interface element. The simplified schematic graphical user interface element 6080 includes an instruction to the target user to select among the assets available for the given offering. Tools are provided to allow each corresponding asset depicted on the graphical user interface element 6080, including asset A and asset B. Corresponding configured graphical I/O tools 6081 and 6082 are provided. These configured graphical I/O tools may be interacted with by the given target user to configure each of the chosen assets for inclusion in the given offering as deployed.

The deployment process may be configured in accordance with the target user interface processes shown in FIGS. 6A and 6B in different ways. Target users may download compiled files or copy and paste URLs from a user-centric social area of a website at which a given provider has provided access to one or more offerings to target users. Users may provide the requested data for configuration of a given offering their opting in for via their desktop, and then enter user password and loyalty information concerning their relationship with that provider on that desktop during setup. Users may provide and request the data through a mobile application setup using their mobile device. This may require that the compiled applications have a new or sign in option during setup. Instructions may be provided to a target user to send files to their mobile device, for example, from a desktop, where the desktop is either tethered to the mobile device or connected in a wireless fashion, for example, via a Bluetooth connection. At that point, they may be prompted to enter their mobile number, and an SMS link may be sent to them.

A user may download a mobile content loyalty application by receiving an SMS message with an embedded web link. A user may download mobile content in a given offering through their mobile and desktop web browsers via links. A user may download mobile content in a giving offering through various platform applications, by submitting a keyword and receiving an embedded link in the message. Other ways the given offering can be opted in by a given target user is by a given target user sharing a given offering to another mobile user as an attachment to an email. A given offering can be shared through Bluetooth to another mobile device.

In a next act 610, a user will partake in a setup of the target user DAP device for the given offering. In a next act 612 the target user DAP device will return to its idle screen, and at which point the new asset or assets will be displayed on that target user DAP device. Those new assets may include, for example, wallpaper and icons.

During the user setup of the DAP device for the given offering at act 610, the target user may provide on the DAP device credentials and vendor preference information at act 6100.

In a next act 6101, OTA provisioning may be carried out, as illustrated in FIG. 6B. A target user provides further data at act 6102. The target user expressly authorizes one or more actions at act 6103, and an application retrieval and installation process occurs at act 6104. Thereafter, confirmation is sent to the provisioning server at act 6105. One or more tracking interfaces and data management processes are then set up at act 6106. An AMS (application management system) downloads the applications and the metadata from the provisioning server repository and installs (if the retrieval is successful) the applications and metadata. The software is provided on the DAP device to manage the download and the installation, and software is also provided on the DAP to manage the removal of such software.

FIG. 7 is a schematic diagram of a computer device or device interface by which offering access and opt-in options can be specified by a given target user. The illustrated offering access and opt-in interface 700 includes a number of graphical input/output elements including a first element 702 by which the target user can download the given offering or assets of the given offering upon receipt of an SMS message with an embedded link. An element input/output tool 704 allows a given target user to download an offering or assets of a given offering through a mobile or desktop web browser via one or more embedded links. A third graphical input/output tool 706 may be provided to allow the given target user to download an offering or one or more assets of a giving offering via one or more visits to various mobile platform application stores. Those stores may include brick and mortar stores or online stores.

A graphical input/output tool 708 may be provided to allow a given target user to submit a keyword short code and receive an embedded link. A graphical tool interface 710, may be provided whereby a target user may send to another target user an offering package as a link or as an attachment via an email. A graphical input/output tool 712 may be provided by which a target user may share the offering via a wireless communication to a proximate DAP device (via a Bluetooth connection).

FIG. 8 is a schematic diagram of graphical user interface elements for a target user's install options. The illustrated graphical user interface 80 includes one or more install options interfaces, including a basic theme basic installation option 82, and a customized theme option 84. Basic theme option 82, allows a given target user to choose a basic installation, and customize theme option 84 allows a given target user to select or deselect items for the given offering. If the target user chooses the customize theme option 84, an additional install option interface 86 may be presented to the target user, for example, on a target user DAP device, or in on desktop computer being utilized for configuration of an offering. Select/deselect item interface 86 includes a number of graphical input/output tools for customizing, for example, the theme of the given offering. For example, a number of different assets may be identified in customized theme interface 86, including calendar entries 88, wallpaper 89, landmarks 90, contacts 91, ringtones 92, widget 93, and subscription 94. Each of these asset types may be provided with a check box or toggle input which can be interacted with via a cursor in order to select or deselect the corresponding event type. If a widget 93 is selected, indicated by a check mark in the box next to the word widget, a description of the asset for that widget may be indicated and configured by the given target user.

FIG. 9 is a schematic representation of graphical user interface elements on a DAP device as part of a deployed offering. The illustrated graphical user interface or interfaces 900 include DAP device interface elements. Those elements include new/modified menu elements 902, now displayed on a target user DAP device 14 as a result of the offering having now been deployed. One or more corresponding assets from the offering may have display elements 904 displayed on target user DAP device 14 display. Those display elements 904 may include, for example, a number of elements including photo gallery elements 906, bookmark entries specific to one or more chosen vendors 908, phone directory entries specific to favorite vendors 910, vendor-supplied ringtones 912, or new keys or soft keys 914. The new keys or soft keys 914 may include keys provided to allow a given user to press that key to cause the target user DAP device to go a web page of a vendor that has provided the given offering 916. Other of elements 904 include a screen saver 916 that displays one or more vendor-specific images of the vendor that is responsible for providing the given offering. Calendar entries 918 may be provided for favorite vendors. One or more vendor widgets 920 may also be provided.

FIG. 10 is a schematic diagram of one or more DAP device interface elements, including graphical user interface elements 1000. Those elements may include, for example, an SMS or MMS message notification 1002. When such a notification occurs, there may by a display or playback of a message 1004. That message may include such sports-related display or playback elements as a textual or graphical game or team identifier 1006, TV channel and programming information 1008, radio information 1010, location information 1011, ticket information 1012, probable baseball pitchers 1014, one or more pictures 1016, 1018, and an opt out graphical tool 1020, a news alert 1022, and a score update 1023.

An additional DAP device interface element 1121 may be provided as shown in FIG. 11, which may be presented on the display of a given target user DAP device. Those elements include a contact vendor interface 1122, a share media content interface 1123, a locate vendor interface 1124, a purchase vendor product interface 1126, and an access or download graphical tool element 1128, by which one or more assets, content, and other data can be accessed or downloaded. Other graphical tool elements include displayed media content 1130, account information 1132, and reward information 1134.

FIG. 12 is a schematic representation of user interface elements for reward account access via a DAP device or another DAP. The illustrated interface 1200 includes user interface elements which includes a graphical representation of a vender-specific widget, 1202 a graphical representation of a widget pertaining to the offering 1204. The offering widget graphical input/output tool 1204 may allow a given target user to interact with and reconfigure various settings of the offering. A user interface element 1206 may be provided for a keyword to short code. A user interface element 1208 may be provided for communicating directly with an intermediate website used to obtain access to the given offering. In addition, a user interface element 1210 may be provided for providing the user direct access to the vendor website, i.e., the website of the vendor that setup and configured the given offering which was opted in by the given target user.

Any one or more of the elements in FIGS. 9-12 may be deployed in an offering by providing new data to an application already on the DAP device, e.g., as when a new address entry is added to an address book application already being used by the DAP user. Alternatively, an offering element may be deployed by modifying an application, or by providing a new application.

FIGS. 13A-13B illustrates a flow chart of a process by which reward data is accumulated for a given user. In an initial act 1302, the offering process as deployed on a given target user DAP device will look at activity data tracked within a given window of time. And in a next act 1304, the activity data will be accumulated to determine a user score based upon that data. When the activity involving vendor offered assets is above a given threshold, reward points may be assigned to a given target user. In addition, for example, when the average clicks per week on a given asset from a given offering exceed a certain threshold value, the given target user may be eligible for one or more specific rewards, coupons, or other business or monetary incentives. Bonus or reward points may be assigned to the given target user, that can be redeemed or be added to other points for redemption at a later point. In the next act 1306, in accordance with the target user score, the number of points (yet to be redeemed) may be associated with the given target user, for example, by placing data concerning those points in a database associated with the given target user, which database can be transmitted from the target user DAP device to some central database accessible by the provider, vendors, and the target user through the use of an appropriate authenticated interface. In a next act 1308, point redemption options are provided to an authenticated target user, through an online interface. Thereafter, at act 1310, a given target user indicates, via an on-screen selection one or more redemption choices. As a result, thereafter, at act 1312, the result of that redemption choice is caused to happen. For example, a product may be sent to the given target user, an electronic coupon may be generated, and/or a coupon may be mailed. In addition, or instead, a store carrying vendor products may be notified that the given target user is entitled to receive those products at no cost or at a reduced price. Other notifications may include notifying a store through an on-line system of the eligibility status of a given target user.

During the installation of a given offering, the contact information of one or more vendors may be synched into the address book of a given target user on the given target user DAP device and the address book application thereon. Depending upon the vendor information that is provided, a given target user may select from, for example, a left soft key menu for additional options. Those options may include, for example, going to the webpage of the vendor.

In addition, during or following installation of a given offering on a target user DAP device, the target user DAP device calendar may be synched with a vendor defined calendar, and certain events concerning products or brands of that vendor, so that they appear as entries within the calendar on the device. A soft key menu including menu options may be provided for additional actions relating to the calendar.

During installation of a given offering, and if a given target user selects a "custom" option of notifications, that given target user may be registered to receive certain information regarding a particular provider, for example, regarding a sports team, including information about the team such as score of a particular game, player and news alerts regarding that sports team. This information may be sent to the target user DAP device implementing the given offering, via SMS and MMS. A given target user may opt out of this notification service, for example, by sending a defined keyword to a supplied short code, for example, in the contact information.

During installation of a given offering, a vendor mobile site URL and title may be added as an entry to the users device web browser, for example, as a bookmark. In addition, a default ringtone of the target user DAP device may be changed so that the default ringtone is the ringtone supplied by a particular vendor, which is either the provider or associated with the provider for a given offering.

The invention claimed is:

1. Apparatus comprising:
   a data access point (DAP) device, the DAP device including a memory subsystem, a bus structure, at least one processor, network interface circuitry, a DAP device display, and user interface elements including display-interactive input devices;
   the DAP device further including computer-readable media having stored unique data and application programs each uniquely configured by and for a given target user using the DAP device;
   the unique data and application programs including given provider aggregated assets previously opted in by the given target user, the given provider aggregated assets having been made available by a given provider to the given target user in the form of a given provider offering; and the DAP device further including node processing circuits configured to manage the given provider aggregated assets, at least a portion of the node processing circuits having been especially provided on the DAP device via remote deployment after and as a result of both (i) the given provider having created the given provider offering via a communications portal specially configured to be accessible to plural different providers to create their own respective different offerings including different aggregations of assets, and (ii) the given target user having opted in to receive the given provider offering.

2. The apparatus according to claim 1, wherein the given provider aggregated assets include applications and media content identifying the given provider and informing the given target user about the given provider.

3. The apparatus according to claim 1, wherein the DAP device includes an embedded device.

4. The apparatus according to claim 3, wherein the DAP device includes a network interface configured to provide wireless access to a wide area network.

5. The apparatus according to claim 4, wherein the DAP device includes a mobile phone.

6. The apparatus according to claim 1, wherein the user interface elements include keys.

7. The apparatus according to claim 1, wherein the user interface elements include touch screen elements.

8. The apparatus according to claim 1, wherein the DAP device further includes a web browsing processing circuit, and wherein the web browsing processing circuit includes at least a portion of computer-readable media carrying encoded data for web browsing and components of an active computer ready to execute the encoded data and thereby cause certain acts to occur including reading of remote hypertext in files accessible via a wide area network.

9. The apparatus according to claim 1, wherein the applications and the media content of the assets include brand image files depicting one or more brands of the given provider.

10. The apparatus according to claim 1, wherein the provider aggregated assets include assets configured to display, via the DAP device display, information describing products of the given provider and information specifying availability time periods during which the given provider's products are available, and wherein the provider is a vendor.

11. The apparatus according to claim 10, wherein the assets are configured to display via the DAP device display price information regarding the given vendor's products.

12. The apparatus according to claim 11, wherein the node processing circuits include one or more offering install processing circuits configured to install a packaged version of the offering.

13. The apparatus according to claim 12, wherein the node processing circuits include an identification (ID) assignment processing circuit configured to assign, for each of plural activities involving use of the given provider offering, provider, target user, and asset element identifiers respectively identifying the given provider, the given target user of the DAP device, and a corresponding asset elements within the given provider offering.

14. The apparatus according to claim 12, wherein the node processing circuits include one or more activity tracking processing circuits configured to track activity and to log activity data in association with corresponding sets of identifiers including a provider identifier, a user identifier, and one or more asset element identifiers.

15. The apparatus according to claim 1, wherein the given provider aggregated assets for the given provider offering include one or more provider address book entries that provide contact information of the provider or of an individual representing the provider, and further include one or more calendar entries with provider events scheduled by the provider.

16. The apparatus according to claim 15, wherein the provider aggregated assets for the given provider offering include a vendor website bookmark, and wherein the provider is a vendor.

17. The apparatus according to claim 16, wherein the provider aggregated assets further include vendor physical site location data.

18. The apparatus according to claim 17, wherein the location data includes vendor landmarks.

19. The apparatus according to claim 17, wherein the location data includes vendor location map data.

20. The apparatus according to claim 17, wherein the provider aggregated assets include service interfacing code including one or more API interfaces configured to call one or more remote APIs of an online vendor notification service.

* * * * *